(12) United States Patent
Shi et al.

(10) Patent No.: US 12,184,373 B2
(45) Date of Patent: Dec. 31, 2024

(54) INFORMATION CSI REPORT, TERMINAL, AND NETWORK DEVICE

(71) Applicant: VIVO MOBILE COMMUNICATION CO., LTD., Guangdong (CN)

(72) Inventors: Yuan Shi, Guangdong (CN); Yang Song, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 482 days.

(21) Appl. No.: 17/537,683

(22) Filed: Nov. 30, 2021

(65) Prior Publication Data

US 2022/0085856 A1 Mar. 17, 2022

Related U.S. Application Data

(63) Continuation of application No. PCT/CN2020/092365, filed on May 26, 2020.

(30) Foreign Application Priority Data

May 31, 2019 (CN) .......................... 201910473363.X

(51) Int. Cl.
  *H04B 7/06* (2006.01)
  *H04L 1/1607* (2023.01)
  *H04L 5/00* (2006.01)

(52) U.S. Cl.
  CPC ......... *H04B 7/0626* (2013.01); *H04B 7/0636* (2013.01); *H04L 1/1614* (2013.01); *H04L 5/0053* (2013.01)

(58) Field of Classification Search
  CPC .... H04B 7/0626; H04B 7/0478; H04B 7/063; H04B 7/0632; H04B 7/0636;
  (Continued)

(56) References Cited

U.S. PATENT DOCUMENTS

| 8,588,259 B2 | 11/2013 | Papasakellariou et al. |
| 2012/0140649 A1 | 6/2012 | Choudhury et al. |

(Continued)

FOREIGN PATENT DOCUMENTS

| CN | 101686495 A | 3/2010 |
| CN | 104584450 A | 4/2015 |

(Continued)

OTHER PUBLICATIONS

Ericsson, On CSI omission procedure, R1-1907076, May 13-17, 2019 agenda item 7.2.8.5 (Year: 2019).*

(Continued)

*Primary Examiner* — Hardikkumar D Patel
(74) *Attorney, Agent, or Firm* — Price Heneveld LLP

(57) ABSTRACT

A method for transmitting a channel state information CSI report, a terminal, and a network device are provided. The method for transmitting a CSI report is applied to a terminal side and includes: dividing non-zero quantized coefficients in a compressed coefficient matrix and a bitmap indicating the quantized coefficients into a plurality of information groups; discarding, based on priority information preset for information groups, at least one of the following information in the CSI report: the quantized coefficients and the bitmap; and transmitting the CSI report with the information discarded.

18 Claims, 6 Drawing Sheets

(58) Field of Classification Search
CPC ... H04B 7/0639; H04B 7/0658; H04L 5/0064; H04L 1/0026; H04L 1/1614; H04L 5/0053; H04L 5/0057
See application file for complete search history.

(56) References Cited

U.S. PATENT DOCUMENTS

| | | |
|---|---|---|
| 2012/0207047 A1 | 8/2012 | Liao et al. |
| 2012/0275398 A1 | 11/2012 | Chen et al. |
| 2013/0322376 A1 | 12/2013 | Marinier et al. |
| 2017/0070312 A1 | 3/2017 | Yi et al. |
| 2019/0297519 A1 | 9/2019 | Han et al. |
| 2020/0136780 A1 | 4/2020 | Chen |
| 2020/0177353 A1 | 6/2020 | Ding et al. |
| 2020/0287670 A1 | 9/2020 | Shao et al. |

FOREIGN PATENT DOCUMENTS

| | | | | |
|---|---|---|---|---|
| CN | 105827295 A | 8/2016 | | |
| CN | 106165323 A | 11/2016 | | |
| CN | 107911203 A | 4/2018 | | |
| CN | 108024281 A | 5/2018 | | |
| CN | 108810932 A | 11/2018 | | |
| CN | 109644119 A | 4/2019 | | |
| CN | 109802797 A | 5/2019 | | |
| CN | 109803408 A | 5/2019 | | |
| WO | WO-2018144737 A1 * | 8/2018 | ........... | H04B 7/0626 |
| WO | 2019069296 A1 | 4/2019 | | |

OTHER PUBLICATIONS

Qualcomm Inc., "CSI Enhancement for MU-MIMO Support", 3GPP TSG RAN WG1 Meeting #97, R1-1907288, May 13-17, 2019 Reno, U.S.A.

Samsung, "On UCI design and omission for DFT-based compression", 3GPP TSG RAN WG1 meeting #97, RI-1906975, May 13-17, 2019, Reno, USA.

Ericsson, "On CSI omission procedure", 3GPP TSG RAN WG1 Meeting RAN1#97, R1-1907076, Reno, US, May 13-17, 2019.

* cited by examiner

INFORMATION CSI REPORT, TERMINAL, AND NETWORK DEVICE

CROSS-REFERENCE TO RELATED APPLICATIONS

This application is a continuation application of PCT International Application No. PCT/CN2020/092365 filed on May 26, 2020, which claims priority to Chinese Patent Application No. 201910473363.X, filed in China on May 31, 2019, the disclosures of which are incorporated in their entireties by reference herein.

TECHNICAL FIELD

This disclosure relates to the field of communications technologies, and in particular, to a method for transmitting a channel state information CSI report, a terminal, and a network device.

BACKGROUND

In a wireless communications system, channel state information (CSI) feedback is enhanced, and CSI feedback is classified into Type 1 and Type 2. Spatial orthogonal linear combination (LC) is used for Type 2 to approximate CSI, for example, eigenvalue vector of a channel. Specifically, L orthogonal beams are selected from oversampling beams obtained through 2-dimensional discrete Fourier transform (2D DFT), to calculate corresponding combination coefficients (complex) of the L orthogonal beams at each layer (or for each eigenvalue vector), and then quantify an amplitude value, phase value, and/or phase angle value thereof. L is configured by a network device. Selection of orthogonal beams is performed based on bandwidth, and is applicable to all ranks, that is, being applicable to all layers. Amplitude quantization for the combination coefficients may be configured to be bandwidth quantization, or bandwidth quantization and subband quantization. Subband amplitude being false indicates bandwidth quantization, and subband amplitude being true indicates bandwidth quantization and subband quantization. Phase angle quantization for the combination coefficients is implemented in each subband.

Further, a CSI report corresponding to Type 2 CSI feedback may be written as a codebook in a frequency domain granularity m, being a 2L×R matrix.

If combination coefficients in all frequency domain granularities are cascaded, a precoding matrix at a layer R in frequency domain can be obtained, and the precoding matrix may be written as a 2L×M matrix.

In order to reduce overheads for CSI feedback, the 2L×M matrix may be compressed to a 2L×K matrix by using a method such as frequency domain compression for frequency domain correlation, time domain compression for sparseness of impulse responses in time domain, and frequency domain difference.

Specifically, a Type 2 CSI report includes part 1 (part1) and part 2 (part2). Part 1 has a fixed payload size, specifically including a rank indicator (RI), a channel quality indicator (CQI), and an indicator indicating the number of non-zero amplitude combination coefficients of bandwidth of each layer. Part 2 includes a precoding matrix indicator (PMI). In the CSI report, part 1 and part 2 are separately encoded, and a payload size of part 2 is determined based on information of part 1.

For transmission of a CSI report on a physical uplink shared channel (PUSCH), because the network device cannot predict a size of the CSI report, especially a payload size of part 2 in the CSI report, a PUSCH resource allocated by the network device possibly cannot accommodate all content of the CSI report. In this case, the terminal may discard subband CSI information, to ensure that the CSI report can be carried in a corresponding uplink resource configured by the network. However, for a Fourier transform-based compressed codebook in new radio (NR), the concept of subband is no longer applied to information carried in a CSI report, and therefore a discarding scheme in the related art cannot be used. In this case, after receiving a CSI report, a network device cannot determine partial CSI content discarded by a terminal, and consequently the network device cannot accurately determine a channel state based on the CSI report, resulting in deterioration of CSI feedback performance.

SUMMARY

Embodiments of this disclosure provide a method for transmitting a channel state information CSI report, a terminal, and a network device, so as to resolve the problem that a network device cannot determine partial CSI content discarded by a terminal, and consequently cannot accurately determine a channel state.

According to a first aspect, an embodiment of this disclosure provides a method for transmitting a channel state information CSI report, applied to a terminal side and including:
  dividing non-zero quantized coefficients in a compressed coefficient matrix and a bitmap indicating the quantized coefficients into a plurality of information groups;
  discarding, based on priority information preset for information groups, at least one of the following information in the CSI report: the quantized coefficients and the bitmap; and
  transmitting the CSI report with the information discarded.

According to a second aspect, an embodiment of this disclosure provides a method for transmitting a channel state information CSI report, applied to a network device side and including:
  receiving a channel state information CSI report of a terminal;
  determining, based on priority information preset for information groups, at least one of the following information in the CSI report: non-zero quantized coefficients in a compressed coefficient matrix at each layer, and a bitmap indicating the quantized coefficients.

According to a third aspect, an embodiment of this disclosure further provides an apparatus for transmitting a channel state information CSI report, applied to a terminal side and including:
  a grouping module, configured to divide non-zero quantized coefficients in a compressed coefficient matrix and a bitmap indicating the quantized coefficients into a plurality of information groups;
  a discarding module, configured to discard, based on priority information preset for information groups, at least one of the following information in the CSI report: the quantized coefficients and the bitmap; and
  a transmitting module, configured to transmit the CSI report with the information discarded.

According to a fourth aspect, an embodiment of this disclosure provides an apparatus for transmitting a channel state information CSI report, applied to a network device side and including:

a receiving module, configured to receive a channel state information CSI report of a terminal; and a processing module, configured to determine, based on priority information preset for information groups, at least one of the following information in the CSI report: non-zero quantized coefficients in a compressed coefficient matrix at each layer, and a bitmap indicating the quantized coefficients.

According to a fifth aspect, an embodiment of this disclosure further provides a communications device, where the communications device includes a processor, a memory, and a program stored in the memory and capable of running on the processor, where when the program is executed by the processor, the steps of the foregoing method for transmitting a channel state information CSI report are implemented.

According to a sixth aspect, an embodiment of this disclosure provides a readable storage medium, where a program is stored in the readable storage medium, and when the program is executed by a processor, the steps of the foregoing method for transmitting a channel state information CSI report are implemented.

In the foregoing solution, at least one of the following information in the CSI report is discarded based on the priority information preset for information groups: the quantized coefficients and the bitmap; and the CSI report with the information discarded is transmitted to the network device. In this way, the network device can receive and parse the CSI report based on the priority information preset for information groups to determine partial content discarded by the terminal. This helps the network device accurately learn about a channel state, thereby optimizing CSI feedback performance.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and a person of ordinary skill in the art may derive other drawings from these accompanying drawings without creative efforts.

FIG. 7 is a block diagram of a network device according to an embodiment of this disclosure; and FIG. 8 to FIG. 14 are schematic diagrams of dividing a bitmap into groups according to an embodiment of this disclosure.

DESCRIPTION OF EMBODIMENTS

Figure 1:
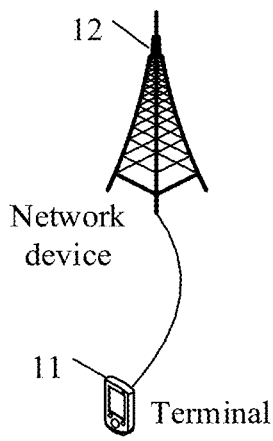
FIG. 1 is a block diagram of a mobile communications system to which the embodiments of this disclosure are applicable.

Exemplary embodiments of this disclosure will be described below in more detail with reference to the accompanying drawings. Although the accompanying drawings show exemplary embodiments of this disclosure, it should be understood that this disclosure may be implemented in various forms and should not be limited by the embodiments described herein. Instead, these embodiments are provided so that this disclosure will be better understood, and the scope of this disclosure can be fully conveyed to those skilled in the art.

In the specification and claims of this disclosure, the terms such as "first" and "second" are intended to distinguish between similar objects but do not necessarily indicate a specific order or sequence. It should be understood that the data used in this way is interchangeable in appropriate circumstances so that the embodiments of this disclosure described herein can be implemented in other orders than the order illustrated or described herein. Moreover, the terms "include", "have" and any other variants mean to cover the non-exclusive inclusion, for example, a process, method, system, product, or device that includes a list of steps or units is not necessarily limited to those units, but may include other units not expressly listed or inherent to such a process, method, product, or device. Use of "and/or" in the specification and claims represents at least one of connected objects.

Technologies described in this specification are not limited to a long term evolution (LTE) or LTE-Advanced (LTE-A) system, and may also be applied to various wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" are usually used interchangeably. The CDMA system can implement radio technologies such as CDMA2000 and Universal Terrestrial Radio Access (UTRA). The UTRA includes wideband CDMA (Wideband Code Division Multiple Access, WCDMA) and other CDMA variants. The TDMA system can implement radio technologies such as a global system for mobile communications (GSM). The OFDMA system can implement radio technologies such as ultra mobile broadband (UMB), evolved UTRA (Evolution-UTRA, E-UTRA), IEEE 802.11 (Wi-Fi), IEEE 802.16 (WiMAX), IEEE 802.20, and Flash-OFDM. The UTRA and E-UTRA are parts of the universal mobile telecommunications system (UMTS). The LTE and more advanced LTE (such as LTE-A) are new UMTS releases that use the E-UTRA. The UTRA, E-UTRA, UMTS, LTE, LTE-A, and GSM are cited from descriptions of the documentation of the organization named "3rd Generation Partnership Project" (3GPP). The CDMA2000 and UMB are cited from descriptions of the documentation of the organization named "3rd Generation Partnership Project 2" (3GPP2). Techniques described in this specification may be used in the aforementioned systems and radio technologies, and can also be used in other systems and radio technologies. However, in the following descriptions, an NR system is described for an illustration purpose, and NR terms are used in most of the following descriptions, although these technologies may also be applied to other applications than an NR system application.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Referring to FIG. 1, FIG. 1 is a block diagram of a wireless communications system to which the embodiments of this disclosure are applicable. The wireless communications system includes a terminal 11 and a network device 12. The terminal 11 may also be referred to as a terminal device or user terminal (User Equipment, UE). The terminal 11 may be a terminal-side device such as a mobile phone, a tablet computer, a laptop computer, a personal digital assistant (PDA), a mobile Internet device (MID), a wearable device, or an in-vehicle device. It should be noted that a specific type of the terminal 11 is not limited in the embodiments of this disclosure. The network device 12 may be a base station or a core network. The base station may be a 5G base station and a base station of a later version (for example, a gNB or a 5G NR NB), or a base station in another communications system (for example, an eNB, a WLAN access point, or another access point). The base station may be referred to as a NodeB, an evolved NodeB, an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, or another appropriate term in the art. As long as a same technical effect is achieved, the base station is not limited to a specific technical term. It should be noted that in the embodiments of this disclosure, the base station in the NR system is merely used as an example, and a specific type of the base station is not limited.

Under control of a base station controller, the base station may communicate with the terminal 11. In various examples, the base station controller may be a part of the core network or some base stations. Some base stations may perform communication of control information or user data with the core network by using backhauls. In some examples, some of these base stations may communicate with each other directly or indirectly by using backhaul links. The backhaul links may be wired or wireless communication links. The wireless communications system may support operations on multiple carriers (wave signals of different frequencies). A multi-carrier transmitter can transmit modulated signals on the multiple carriers simultaneously. For example, multi-carrier signals modulated by using various radio technologies may be transmitted on each communication link. Each modulated signal may be transmitted on different carriers and may carry control information (for example, a reference signal or a control channel), overhead information, data, and the like.

The base station may perform wireless communication with the terminal 11 by using antennas of one or more access points. Each base station may provide communication coverage for a corresponding coverage area of the base station. A coverage area of an access point may be divided into sectors forming only a part of the coverage area. The wireless communications system may include different types of base stations (for example, a macro base station, a micro base station, or a picocell base station). The base station may also use different radio technologies, for example, a cellular or WLAN radio access technology. The base station may be associated with a same or different access networks or operator deployments. Coverage areas of different base stations (including coverage areas of base stations of a same type or different types, coverage areas using a same radio technology or different radio technologies, or coverage areas of a same access network or different access networks) may overlap each other.

A communication link in the wireless communications system may include an uplink for carrying uplink (UL) transmission (for example, from the terminal 11 to the network device 12) or a downlink for carrying downlink (DL) transmission (for example, from the network device 12 to the terminal 11). UL transmission may also be referred to as reverse link transmission, and DL transmission may also be referred to as forward link transmission. Downlink transmission may be implemented by using a licensed band, an unlicensed band, or both. Similarly, uplink transmission may be implemented by using a licensed band, an unlicensed band, or both.

In a wireless communications system in the related art, a Type 2 CSI report includes part 1 (part1) and part 2 (part2). Part 1 has a fixed payload size, specifically including a rank indicator (RI), a channel quality indicator (CQI), and an indicator indicating the number of non-zero amplitude combination coefficients of bandwidth of each layer. Part 2 includes a precoding matrix indicator (PMI). In the CSI report, part 1 and part 2 are separately encoded, and a payload size of part 2 is determined based on information of part 1.

A two-layer codebook in a frequency domain granularity m for the CSI report may be written as:

$$(W^{(m)})_{2N_1 N_2 \times R} =$$

$$(W_1)_{2N_1 N_2 \times 2L}(W_2^{(m)})_{2L \times R} = \begin{bmatrix} B & 0 \\ 0 & B \end{bmatrix} W_2^{(m)} = \begin{bmatrix} b_1, \ldots, b_L & 0 \\ 0 & b_1, \ldots, b_L \end{bmatrix}$$

$$W_2^{(m)} = [b'_1, \ldots, b'_{2L}] \begin{bmatrix} c_{1,1}^{(m)} & & c_{1,R}^{(m)} \\ \vdots & \ldots & \vdots \\ c_{2L,1}^{(m)} & & c_{2L,R}^{(m)} \end{bmatrix}$$

$N_1$ and $N_2$ are the number of ports for CSI reference signals (CCSI-RS) in two dimensions; R is the number of ranks or the number of layers; $b'_1$ is an orthogonal vector formed by 2D-DFT beam vectors; $c_{1,r}(m)$ is a combination coefficient of the 1$^{st}$ orthogonal beam vector of layer r at the frequency domain granularity m; r=1, 2, . . . , R; l=1, 2, . . . , 2L; and L is the number of selected orthogonal beams. The frequency domain granularity may be a subband or a resource block (RB). Using the frequency domain granularity as a unit, the wideband may be divided into M frequency domain resources.

If combination coefficients of all subbands are cascaded together, a precoding matrix of layer r in frequency domain may be obtained, and the precoding matrix is a precoding matrix of a specific layer in wideband (or referred to as frequency domain). That is, the combination coefficients at all the frequency domain granularities may be cascaded to obtain the precoding matrix of layer r in frequency domain. The precoding matrix may be written as a 2L×M matrix:

$$(W_r)_{2N_1 N_2 \times M} = (W_1)_{2N_1 N_2 \times 2L}(W_{2,r})_{2L \times M} = [b'_1, \ldots, b'_{2L}] \begin{bmatrix} c_{1,r}^{(1)} & & c_{1,r}^{(M)} \\ \vdots & \ldots & \vdots \\ c_{2L,r}^{(1)} & & c_{2L,r}^{(M)} \end{bmatrix}$$

$c_{1,r}(m)$ is a combination coefficient of the 1$^{st}$ orthogonal beam vector of layer r at the frequency domain granularity m. The $1^{st}$ row in $W_{2,r}$ indicates a matrix of combination coefficients for the beam vector $b'_1$ at all frequency domain granularities, and is expressed as follows:

$$W_{2,r} = \begin{bmatrix} c_{1,r}^{(1)} & & c_{1,r}^{(M)} \\ \vdots & \cdots & \vdots \\ c_{2L,r}^{(1)} & & c_{2L,r}^{(M)} \end{bmatrix}$$

Due to correlation in frequency domain, the matrix $(W_{2,r})_{2L \times M}$ of these coefficients may be further compressed in frequency domain. In addition, time domain compression may be performed due to sparseness of channel impulse responses in time domain. Frequency domain compression and time domain compression are equivalent in some senses.

A compressed matrix is a 2L×K matrix formed by elements that are extracted from the product of a precoding matrix and an orthogonal basis initial vector matrix, where K is a value less than M, and K may be configured by the network device, or may be specified by a protocol, or may be autonomously determined by the terminal. For example, $W_{2,r}$ is transformed to $W_3$ through spatial domain compression for Type 2 CSI feedback, that is, $W_{2,r}W_3 = \tilde{W}_{2,r}$, and $W_{2,r} = \tilde{W}_{2,r}W_3^H$ is obtained based on orthogonality of $W_3$.

It is assumed that $W_3$ is determined to be an M×M inverse discrete Fourier transform (IDFT) matrix, equivalent to transforming combination coefficients from frequency domain to time domain. If frequency domain coefficients after spatial domain compression are sparse in time domain, only a small quantity of time domain coefficients with relatively large amplitude may be fed back, and other time domain coefficients are zero. It is assumed that only $k_r$ time domain coefficients with the largest amplitude obtained through IDFT are fed back: $(\tilde{W})_{2L \times k_r}$.

The number of complexes that need to be fed back at each layer is reduced from (2L−1)M to (2L)$k_r$, and indexes of selected k1 non-zero coefficients are also fed back, thereby implementing time domain compression, where an orthogonal basis vector matrix selected from corresponding positions of $\tilde{W}$ is $\tilde{W}_3$.

It is assumed that $\tilde{W}_3$ includes selected $k_r$ optimal orthogonal vectors, and $k_r < M$. In this case, $W_{2,r}$ may be approximated. For example, $\tilde{W}_3$ includes selected $k_r$ orthogonal DFT vectors, K right singular vectors obtained through singular value decomposition (SVD) decomposition, or the like. $W_{2,r}$ is transformed to:

$$(W_{2,r})_{2L \times M}(\tilde{W}_3)_{M \times k_r} = (\tilde{\tilde{W}})_{2L \times k_r}.$$

In this way, content that needs to be fed back changes from 2L×M $\tilde{W}_{2,r}$ to 2L×$k_r$ $\tilde{\tilde{W}}$ and indexes of $k_r$ orthogonal vectors. The number of complexes that need to be fed back at each layer is reduced from (2L−1)M to 2L*$k_r$, implementing frequency domain compression.

Therefore, the terminal needs to feed back quantized $\tilde{\tilde{W}}$ and index indication information of the orthogonal basis vector matrix $\tilde{W}_{3,r}$ selected from the corresponding positions of $\tilde{W}$.

At present, the differential polarization method has been used for quantization in NR. The specific quantization method is as follows: In the $\tilde{W}$ matrix, largest amplitude coefficients are found from the first L rows and the last L rows to form a polarization matrix. The L rows with the strongest amplitude coefficients are referred to as a strongly polarized portion, and the other half is referred to as a weakly polarized part. For the $\tilde{W}$ matrix, the first L rows and the last L rows are normalized based on corresponding largest amplitude coefficients. For the polarization matrix, normalization is also performed based on largest amplitude coefficients in the polarization matrix. The strongly polarized coefficients in the polarization matrix are normalized to 1, not requiring amplitude and phase quantization. The terminal informs the network device by using strongest coefficient indication information that weak amplitude polarization coefficients need to be quantized. For a $\tilde{W}$ matrix (for $\{c_{l,k}, (l,k) \neq (l^*, k^*)\}$) obtained through polarization and normalization, both amplitude and phase quantization needs to be performed.

After codebook compression, the following parameters are present:

K0: the number of subset coefficients that is configured by the network device, and indicates how many coefficients in the multi-layer compressed coefficient matrix $\tilde{\tilde{w}}$ need to be fed back. To be specific, coefficients other than K0 coefficients in the $\tilde{\tilde{w}}$ matrix are considered to be 0 and are not fed back. For rank ½, K0 coefficients are independently selected for different layers. For rank ¾, 2*K0 coefficients are selected for all layers, that is, for rank 1, only K0 coefficients need to be quantized. For rank >1, a total of 2*K0 coefficients need to be quantized for all layers.

Non-zero coefficient indication information (Number Of Non-Zero Coefficients Indication, NNZCI): For the multi-layer compressed coefficient matrix $\tilde{\tilde{w}}$, the sum of all non-zero coefficients is K1, and the total number of subset coefficients is K0 or 2*K0. If K1 is less than the total number of subset coefficients, the terminal merely needs to feed back K1 coefficients. In this case, the non-zero coefficient indication information needs to be fed back through part 1.

Bitmap: A bitmap is a matrix of X rows and Xi columns. The rows are related to the number of spatial domain (SD) beams, and the columns are related to the number of orthogonal basis beams, where i represents a layer index. Each layer has an independent bitmap to indicate positions of non-zero coefficients at the current layer and the number of non-zero coefficients at the current layer.

When a Type 2 CSI report is transmitted on a PUSCH, because the network device cannot know in advance a size of CSI feedback, especially a payload size of part 2, an allocated PUSCH resource possibly cannot accommodate all content of the CSI report, and therefore the terminal needs to discard and skip feeding back partial content of CSI part 2. Assuming that N CSI reports need to be fed back in one slot, content of CSI part 2 is discarded based on priorities shown in Table 1. Priority 0 is the highest priority, that is, content of a CSI report is transmitted preferentially; and priority 2N is the lowest priority, that is, content of a CSI report is first discarded. During discarding, all content of a CSI report with one priority is discarded.

TABLE 1

Priority reporting levels for Part 2 CSI

Priority 0:
Part 2 wideband CSI for CSI reports 1 to N
Priority 1:
Part 2 subband CSI of even subbands for CSI report 1
Priority 2:
Part 2 subband CSI of odd subbands for CSI report 1
Priority 3:
Part 2 subband CSI of even subbands for CSI report 2

TABLE 1-continued

Priority reporting levels for Part 2 CSI

Priority 4:
Part 2 subband CSI of odd subbands for CSI report 2
...
Priority 2N − 1:
Part 2 subband CSI of even subbands for CSI report N
Priority 2N:
Part 2 subband CSI of odd subbands for CSI report N When the UE is scheduled to transmit uplink data (transport block) and one or more CSI reports on the PUSCH, if $$\left\lceil (O_{CSI-2} + L_{CSI-2}) \cdot \beta_{offset}^{PUSCH} \frac{\sum_{l=0}^{N_{symb,all}^{PUSCH}-1} M_{sc}^{UCI}(l)}{\sum_{r=0}^{C_{UL-SCH}-1} K_r} \right\rceil$$

is greater than $$\left\lceil \alpha \cdot \sum_{l=0}^{N_{symb,all}^{PUSCH}-1} M_{SC}^{UCI}(l) \right\rceil - Q'_{ACK} - Q'_{CSI-1},$$

CSI part 2 is discarded based on the foregoing sequence level by level, until $$\left\lceil (O_{CSI-2} + L_{CSI-2}) \cdot \beta_{offset}^{PUSCH} \frac{\sum_{l=0}^{N_{symb,all}^{PUSCH}-1} M_{sc}^{UCI}(l)}{\sum_{r=0}^{C_{UL-SCH}-1} K_r} \right\rceil$$

is less than or equal to $$\left\lceil \alpha \cdot \sum_{l=0}^{N_{symb,all}^{PUSCH}-1} M_{SC}^{UCI}(l) \right\rceil - Q'_{ACK} - Q'_{CSI-1}.$$

$O_{CSI-2}$ is the number of bits of CSI part 2.

If $O_{CSI-2} \geq 360$, $L_{CSI-2}=11$; otherwise, $L_{CSI-2}$ is the number of cyclic redundancy check (CRC) bits of CSI part 2 that is determined according to a preset rule.

$\beta_{offset}^{PUSCH} = \beta_{offset}^{CSI-part2}$, $\beta_{offset}^{CSI-part2}$ is a preset CSI offset.

$N_{symb,all}^{PUSCH}$ is a total number of OFDM symbols in the PUSCH, including all OFDM symbols for transmitting DMRS.

$M_{sc}^{UCI}(l)$ is the number of REs used for transmitting UCI on OFDM symbol l in the PUSCH.

$C_{UL-SCH}$ is the number of code blocks of the UL-SCH that is transmitted on the PUSCH.

If DCI scheduling the PUSCH includes a code block group transmission information (CBGTI) field that indicates not transmitting the $r^{th}$ code block by the UE, $K_r=0$; otherwise, $K_r$ is a size of the $r^{th}$ code block of the UL-SCH that is transmitted on the PUSCH.

$Q'_{CSI-1}$ is the number of coded modulation symbols of each layer for CSI part 1 transmitted on the PUSCH.

If the number of bits of HARQ-ACK information is greater than 2, $Q'_{ACK}$ is the number of coded modulation symbols for each layer transmitted on the PUSCH. If the number of bits of HARQ-ACK information is equal to 1 or 2, $Q'_{ACK}=0$.

α is a proportional parameter configured by a higher layer.

When the UE transmits only a CSI report on the PUSCH, CSI part 2 is discarded based on the foregoing sequence level by level until a code rate of CSI part 2 is lower than a threshold code rate $c_T$ being less than 1, where $$c_T = \frac{R}{\beta_{offset}^{CSI-part2}} \cdot \beta_{offset}^{CSI-part2}$$

is a preset CSI offset, and R is a code rate indicated by DCI.

During transmission of Type 2 CSI on the PUCCH, discarding of CSI part 2 is still performed based on the priorities of Table 1, starting from the lowest priority until the code rate of part 2 CSI is less than or equal to a parameter maxCodeRate configured by the higher layer.

The Type 2 CSI discarding scheme in the related art is to directly discard subband CSI information to ensure that the CSI report can be accommodated in an uplink resource configured by a corresponding network device. However, for a Fourier transform-based compressed codebook in new radio (NR), a subband concept is no more applied to information carried in a CSI report, and therefore the discarding scheme in the related art cannot be used. In this case, after receiving a CSI report, the network device cannot determine partial CSI content discarded by the terminal, and consequently the network device cannot accurately determine a channel state based on the CSI report, resulting in deterioration of CSI feedback performance.

To resolve the foregoing problem, the embodiments of this disclosure provide a method for transmitting a channel state information CSI report, a terminal, and a network device, so as to resolve the problem that a network device cannot determine partial CSI content discarded by a terminal, and consequently cannot accurately determine a channel state.

Figure 2:
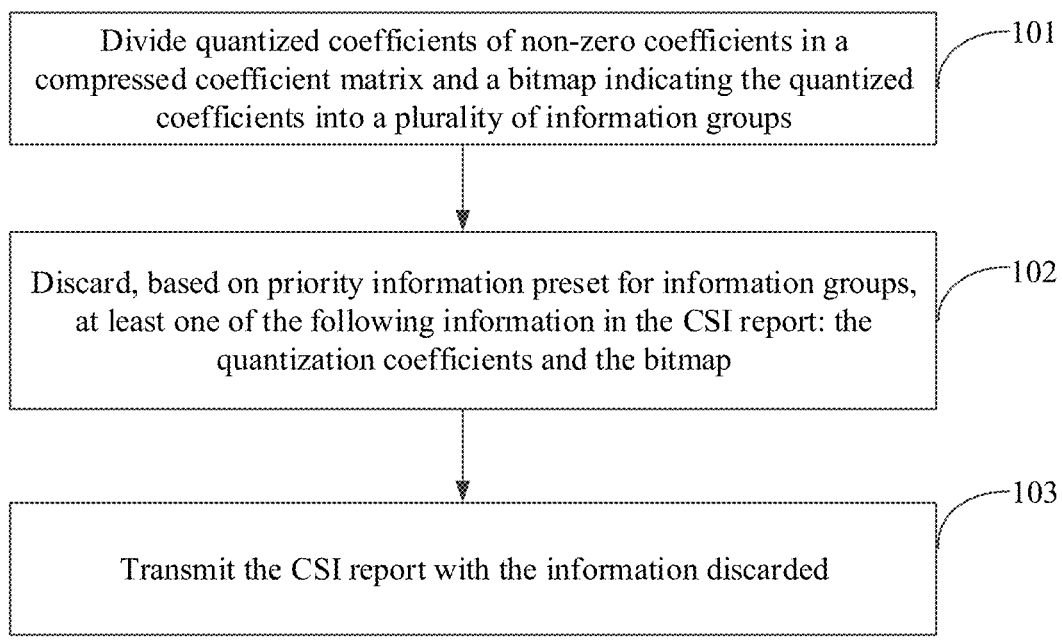
FIG. 2 is a schematic flowchart of a method for transmitting a CSI report from the perspective of a terminal according to an embodiment of this disclosure.

An embodiment of this disclosure provides a method of transmitting a channel state information CSI report applied to a terminal side. As shown in FIG. 2, this method may include the following steps.

Step 101: Divide non-zero quantized coefficients in a compressed coefficient matrix and a bitmap indicating the quantized coefficients into a plurality of information groups.

Step 102: Discard, based on priority information preset for information groups, at least one of the following information in the CSI report: the quantized coefficients and the bitmap.

Step 103: Transmit the CSI report with the information discarded.

In this embodiment, based on the priority information preset for information groups, at least one of the following information in the CSI report is discarded: the quantized coefficients and the bitmaps, and the CSI report with the information discarded is transmitted to the network device. In this way, the network device can receive and parse the CSI report based on the priority information preset for information groups to determine partial content discarded by the terminal. This helps the network device accurately learn about a channel state, thereby optimizing CSI feedback performance.

In a specific embodiment, before the information in the CSI report is discarded, the method further includes:
    obtaining an uplink channel resource used for transmitting the CSI report;
    calculating an uplink channel resource required for transmitting the CSI report; and determining that the uplink channel resource that is obtained is less than a resource required for transmitting the CSI report.

The uplink channel resource includes, but is not limited to, a physical uplink control channel (PUCCH) and/or a physical uplink shared channel (PUSCH), and the like. Optionally, the uplink channel resource may be semi-statically configured for the terminal by the network device by using radio resource control (RRC) signaling, or may be dynamically indicated to the terminal by using a physical downlink control channel (PDCCH).

After compression is completed, the terminal obtains bitmaps of all layers and quantized coefficients indicated by the bitmap. The quantized coefficient includes at least one of the following: an amplitude quantization value and a phase quantization value. The quantized coefficient indicates implementation of bit-level quantization. The bitmap is a full-dimension matrix before bit mapping is performed, with the number of rows being equal to a 2*SD beam quantity and the number of columns being equal to an FD basis quantity, where the SD beam is a spatial domain beam, and the FD is an orthogonal basis.

Optionally, the priority information preset for information groups satisfies any one of the following rules:
  a bitmap of each group and quantized coefficients indicated by the bitmap belong to a same information group, and a priority of the bitmap is the same as a priority of the quantized coefficients indicated by the bitmap;
  a bitmap of each group and quantized coefficients indicated by the bitmap belong to a same information group, and a priority of the bitmap is higher than a priority of the quantized coefficients indicated by the bitmap;
  a bitmap of each group and quantized coefficients indicated by the bitmap belong to adjacent information groups, and a priority of the bitmap is higher than a priority of the quantized coefficients indicated by the bitmap; or
  a bitmap of each group and quantized coefficients indicated by the bitmap belong to adjacent information groups, and a priority of the bitmap is lower than a priority of the quantized coefficients indicated by the bitmap.

During discarding of the information in the CSI report, the bitmap and the quantized coefficient are discarded in an ascending order of priorities. An information group with a lowest priority is first discarded, and all content corresponding to one priority is discarded.

In a case that the bitmap and quantized coefficients indicated by the bitmap belong to a same information group, and their priorities are the same, if the information group needs to be discarded, the bitmap of the information group and the quantized coefficients indicated by the bitmap are both discarded. In a case that the bitmap and quantized coefficients indicated by the bitmap belong to a same information group, and a priority of the bitmap is higher than a priority of the quantized coefficients indicated by the bitmap, if the information group needs to be discarded, the quantized coefficients indicated by the bitmap are first discarded.

In a specific embodiment, the priority information preset for information groups satisfies any one of the following rules:
  a priority of an information group a is higher than a priority of an information group a+1, where a is greater than or equal to 0 and less than a group quantity, and is an information group index; or
  a priority of an information group a+1 is higher than a priority of an information group a.

In a specific embodiment, dividing the bitmap into groups includes any one of the following:
  mapping elements of the bitmap to a bit stream column by column, and dividing the bit stream into N information subgroups, where N−1 information subgroups each correspond to elements of P columns in the bitmap, P is a preset group length, N is equal to ceil(BH/P) or floor(BH/P), ceil is round up, floor is round down, and BH is the number of columns in the bitmap;
  mapping elements of the bitmap to a bit stream row by row, and dividing the bit stream into N information subgroups, where N−1 information subgroups each correspond to elements of Q rows in the bitmap, Q is a preset group length, N is equal to ceil(BL/Q) or floor(BL/Q), and BL is the number of rows in the bitmap;
  dividing the bitmap into A*B portions, where (A−1)*(B−1) portions include elements of P columns and Q rows; and mapping the bitmap to a bit stream portion by portion, where each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], and floor[(BH/P)*(BL/Q)];
  mapping elements of the bitmap to a bit stream column by column, and dividing the bit stream into N information subgroups, where N−1 information subgroups each include S bits, S is a preset group length, N is equal to ceil(BS/S) or floor(BS/S), and BS is a total number of bits in the bitmap; or mapping elements of the bitmap to a bit stream row by row, and dividing the bit stream into N information subgroups, where N−1 information subgroups each include S bits, and S is a preset group length.

In a specific embodiment, dividing the bitmap into groups includes dividing a bitmap of each layer into groups, and the dividing a bitmap of each layer into groups includes any one of the following:
  mapping elements of the bitmap to a bit stream column by column, and dividing the bit stream into N information subgroups, where N−1 information subgroups each correspond to elements of P columns in the bitmap, P is a preset group length, N is equal to ceil(BH/P) or floor(BH/P), ceil is round up, floor is round down, and BH is the number of columns in the bitmap;
  mapping elements of the bitmap to a bit stream row by row, and dividing the bit stream into N information subgroups, where N−1 information subgroups each correspond to elements of Q rows in the bitmap, Q is a preset group length, N is equal to ceil(BL/Q) or floor(BL/Q), and BL is the number of rows in the bitmap;
  dividing the bitmap into A*B portions, where (A−1)*(B−1) portions include elements of P columns and Q rows; and mapping the bitmap to a bit stream portion by portion, where each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], and floor[(BH/P)*(BL/Q)];
  mapping elements of the bitmap to a bit stream column by column, and dividing the bit stream into N information subgroups, where N−1 information subgroups each include S bits, S is a preset group length, N is equal to ceil(BS/S) or floor(BS/S), and BS is a total number of bits in the bitmap; or mapping elements of the bitmap to a bit stream row by row, and dividing the bit stream into N information subgroups, where N−1 information subgroups each include S bits, and S is a preset group length.

The number of elements in the bitmap is equal to: 2*SD beam quantity*FD basis quantity, or 2*SD beam quantity*FD basis quantity−1.

In a specific embodiment, after division of the bitmap of each layer into groups, information subgroups of all layers are combined into N information groups, where each information group includes j information subgroups, the j information subgroups belong to different layers, and j is the number of layers.

That the information subgroups of all layers are combined into N information groups includes:

assigning group indexes to information subgroups of each layer separately, where information subgroups with a same group index belong to a same information group, and a group index of an information group is equal to a group index of an information subgroup contained therein.

In a specific embodiment, dividing the quantized coefficient into groups includes any one of the following:

mapping quantized coefficients indicated by each information group to the information group; or mapping quantized coefficients indicated by each information group to an information group adjacent to the information group.

In a specific embodiment, in a case that the bitmap and quantized coefficients indicated by the bitmap belong to a same information group, in each of the information groups, a bitmap of each layer is followed by quantized coefficients indicated by the bitmap or bitmaps of all layers are followed by quantized coefficients indicated by the bitmaps; and in a case that the bitmap and quantized coefficients indicated by the bitmap belong to different information groups, a bitmap of each group is followed by quantized coefficients indicated by the bitmap.

For example, in a specific example, a bitmap of a specific group is followed by quantized coefficients indicated by the bitmap of the group.

| Bitmap of group 0 | Quantized co-efficients indicated by the bitmap of group 0 | Bitmap of group 1 | Quantized co-efficients indicated by the bitmap of group 1 | ... | Bitmap of group E | Quantized co-efficients indicated by the bitmap of group E |
|---|---|---|---|---|---|---|

In another specific example, in a specific information group, a bitmap at a specific layer is followed by quantized coefficients indicated by the bitmap of the layer.

| Bitmap of layer 0 in group 0 | Quantized coefficients indicated by the bitmap of layer 0 in group 0 | Bitmap of layer 1 in group 0 | Quantized coefficients indicated by the bitmap of layer 1 in group 0 |
|---|---|---|---|
| ... | Bitmap of layer ri − 1 in group 0 | Quantized coefficients indicated by the bitmap of layer ri − 1 in group 0 | Bitmap of layer 0 in group 1 |
| Quantized coefficients indicated by the bitmap of layer 0 in group 1 | ... | Bitmap of layer ri − 1 in group E | Quantized coefficients indicated by the bitmap of layer ri − 1 in group E | ri represents a total number of layers selected by the terminal.

In a specific embodiment, in each of the information groups, bitmaps of different layers are arranged in any one of the following orders:

bitmaps of different layers are arranged in ascending order of layer indexes;

bitmaps of different layers are arranged in descending order of layer indexes; or bitmaps of different layers are arranged in a preset order of layer indexes.

In a specific embodiment, in a case that BH/P is a non-integer and N is equal to ceil(BH/P), the number of element columns corresponding to any one of the following information subgroups is less than the number of element columns corresponding to other information subgroups:

the first information subgroup;

the last information subgroup; or an information subgroup in which an element indicating a strongest coefficient is located.

In a case that BH/P is a non-integer and N is equal to floor(BH/P), the number of element columns corresponding to any one of the following information subgroups is greater than the number of element columns corresponding to other information subgroups:

the first information subgroup;

the last information subgroup; or an information subgroup in which an element indicating a strongest coefficient is located.

In a case that BL/Q is a non-integer and N is equal to ceil(BL/Q), the number of element rows corresponding to any one of the following information subgroups is less than the number of element rows corresponding to other information subgroups:

the first information subgroup;

the last information subgroup; or an information subgroup in which an element indicating a strongest coefficient is located.

In a case that BL/Q is a non-integer and N is equal to floor(BL/Q), the number of element rows corresponding to any one of the following information subgroups is greater than the number of element rows corresponding to other information subgroups:

the first information subgroup;

the last information subgroup; or an information subgroup in which an element indicating a strongest coefficient is located.

In a case that BL/Q or BH/P is a non-integer and A*B is equal to ceil(BH/P)*ceil(BL/Q) or ceil[(BH/P)*(BL/Q)], the number of elements corresponding to any one of the following information subgroups or a combination of information subgroups is less than the number of elements corresponding to other information subgroups:

the first information subgroup;

the last information subgroup;

an information subgroup in which an element indicating a strongest coefficient is located; or an information subgroup in which an element indicating a strongest coefficient is located, and any one of other information subgroups.

In a case that BL/Q or BH/P is a non-integer and A*B is equal to floor(BH/P)*floor(BL/Q) or floor[(BH/P)*(BL/Q)], the number of elements corresponding to any one of the following information subgroups or a combination of information subgroups is greater than the number of elements corresponding to other information subgroups:

the first information subgroup;

the last information subgroup;

an information subgroup in which an element indicating a strongest coefficient is located; or an information subgroup in which an element indicating a strongest coefficient is located, and any one of other information subgroups.

In a specific embodiment, the mapping the bitmap to a bit stream portion by portion includes any one of the following:

mapping elements of each portion to a bit stream column by column in ascending order of column indexes;

mapping elements of each portion to a bit stream column by column in descending order of column indexes;

mapping elements of each portion to a bit stream row by row in ascending order of row indexes; or mapping elements of each portion to a bit stream row by row in descending order of row indexes.

In a specific embodiment, the mapping elements of the bitmap to a bit stream column by column includes any one of the following:

mapping the elements of the bitmap to a bit stream column by column in ascending order of column indexes; or mapping the elements of the bitmap to a bit stream column by column in descending order of column indexes.

Mapping elements of one column to a bit stream includes any one of the following:

mapping the elements of the column to a bit stream in descending order of row indexes of the elements of the column; or mapping the elements of the column to a bit stream in ascending order of row indexes of the elements of the column.

In a specific embodiment, the mapping elements of the bitmap to a bit stream row by row includes any one of the following:

mapping the elements of the bitmap to a bit stream row by row in ascending order of row indexes; or mapping the elements of the bitmap to a bit stream row by row in descending order of row indexes.

Mapping elements of one row to a bit stream includes any one of the following:

mapping the elements of the row to a bit stream in descending order of column indexes of the elements of the row; or mapping the elements of the row to a bit stream in ascending order of column indexes of the elements of the row.

An element, corresponding to a strongest coefficient, in the bitmap may not be mapped to a bit stream, or may be mapped to a bit stream.

In a specific embodiment, in the case of dividing the bit stream into N groups, where N−1 groups each correspond to elements of P columns in the bitmap, the method further includes assigning a group index to each information subgroup according to any one of the following rules:

assigning a group index to each information subgroup based on a sum of column indexes of all elements corresponding to the information subgroup;

assigning a group index to each information subgroup based on a minimum column index of all elements corresponding to the information subgroup;

defining that an information subgroup in which an element indicating a strongest coefficient is located has a largest a group index, and assigning group indexes to other information subgroups based on a sum of column indexes of all elements corresponding to each information subgroup;

defining that an information subgroup in which an element indicating a strongest coefficient is located has a smallest group index, and assigning group indexes to other information subgroups based on a sum of column indexes of all elements corresponding to each information subgroup;

defining that an information subgroup in which an element indicating a strongest coefficient is located has a largest group index, and assigning group indexes to other information subgroups based on a minimum column index of all elements corresponding to each information subgroup;

defining that an information subgroup in which an element indicating a strongest coefficient is located has a smallest group index, and assigning group indexes to other information subgroups based on a minimum column index of all elements corresponding to each information subgroup;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

In a specific embodiment, in the case of dividing the bit stream into N groups, where N−1 groups each correspond to elements of Q rows in the bitmap, the method further includes assigning a group index to each information subgroup according to any one of the following rules:

assigning a group index to each information subgroup based on a sum of row indexes of all elements corresponding to the information subgroup;

assigning a group index to each information subgroup based on a minimum row index of all elements corresponding to the information subgroup;

defining that an information subgroup in which an element indicating a strongest coefficient is located has a largest group index, and assigning group indexes to other information subgroups based on a sum of row indexes of all elements corresponding to each information subgroup;

defining that an information subgroup in which an element indicating a strongest coefficient is located has a smallest group index, and assigning group indexes to other information subgroups based on a sum of row indexes of all elements corresponding to each information subgroup;

defining that an information subgroup in which an element indicating a strongest coefficient is located has a largest group index, and assigning group indexes to other information subgroups based on a minimum row index of all elements corresponding to each information subgroup;

defining that an information subgroup in which an element indicating a strongest coefficient is located has a smallest group index, and assigning group indexes to other information subgroups based on a minimum row index of all elements corresponding to each information subgroup;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

In a specific embodiment, in the case of dividing the bitmap into A*B portions and mapping the bitmap to a bit stream portion by portion, where each portion is one information subgroup, the method further includes assigning a group index to each information subgroup according to any one of the following rules:

sorting information subgroups based on row index information and column index information that are of all elements corresponding to the information subgroups, and assigning a group index to each information subgroup based on a sequence of the information subgroups;

defining that an information subgroup in which an element indicating a strongest coefficient is located has a smallest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a largest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

Sorting information subgroups based on row index information and column index information that are of all elements corresponding to the information subgroups includes any one of the following:

first sorting the information subgroups based on the row index information, and then sorting information subgroups with same row index information based on the column index information; or first sorting the information subgroups based on the column index information, and then sorting information subgroups with same column index information based on the row index information.

Optionally, the sorting the information subgroups based on the row index information includes any one of the following:

sorting the information subgroups in ascending order of the row index information; or sorting the information subgroups in descending order of the row index information.

The sorting the information subgroups based on the column index information includes any one of the following:

sorting the information subgroups in ascending order of the column index information; or sorting the information subgroups in descending order of the column index information.

The row index information includes any one of the following: a sum of row indexes and a minimum row index.

The column index information includes any one of the following: a sum of column indexes and a minimum column index.

In a specific embodiment, the information subgroup in which the element indicating the strongest coefficient is located is the $i^{th}$ group, and the sorting other information subgroups by using the information subgroup in which the element indicating the strongest coefficient is located as a start point includes:

in a case that i is equal to 1, a sequence of the other information subgroups is the $(i+1)^{th}$ group, the $(i+2)^{th}$ group, . . . , the $N^{th}$ group;

in a case that i is equal to N, a sequence of the other information subgroups is the $1^{st}$ group, the $2^{nd}$ group, . . . , the $(N-1)^{th}$ group; or in a case that i is greater than 1 and less than N, a sequence of the other information subgroups is any one of the following:

the $(i+1)^{th}$ group, . . . , the $N^{th}$ group, the $1^{st}$ group, the $2^{nd}$ group, . . . , the $(i-1)t^{h}$ group; or the $1^{st}$ group, . . . , the $(i-1)^{th}$ group; the $(i+1)^{th}$ group; . . . , the $N^{th}$ group.

In a case that a value of N is 2, any one of the following is used:

a priority of an information subgroup in which an element indicating a strongest coefficient is located is higher than a priority of the other information group; or a priority of an information subgroup in which an element indicating a strongest coefficient is located is lower than a priority of the other information group.

Optionally, the group length is determined in any one of the following manners:

being specified by a protocol;
being configured by the network device; and
being configured by the terminal and reported to the network device;
being equal to the number of spatial domain beams that is configured by the network device; and
being obtained through calculation based on a group coefficient, where the group coefficient is greater than or equal to 0 and less than or equal to 1.

Optionally, the group coefficient is determined in any one of the following manners:
being specified by the protocol;
being configured by the network device; and
being configured by the terminal and reported to the network device.

Optionally, in a case that the group length is obtained through calculation based on the group coefficient, the group length is obtained through calculation in any one of the following manners:
the group length=ceil(the group coefficient*dimension), where the dimension is equal to a row or column length of the bitmap;
the group length=floor(the group coefficient*dimension), where the dimension is equal to a row or column length of the bitmap;
the group length=floor(the group coefficient*BS); or
the group length=ceil(the group coefficient*BS).

The following further describes the method for transmitting a CSI report for the terminal with reference to specific embodiments.

In the following embodiment, an SD beam quantity configured by the network is 4, and an FD basis quantity is 7. The terminal reports a two-layer codebook, and dimensions of each layer of codebook are 8 rows and 7 columns.

Figures 7, 8:
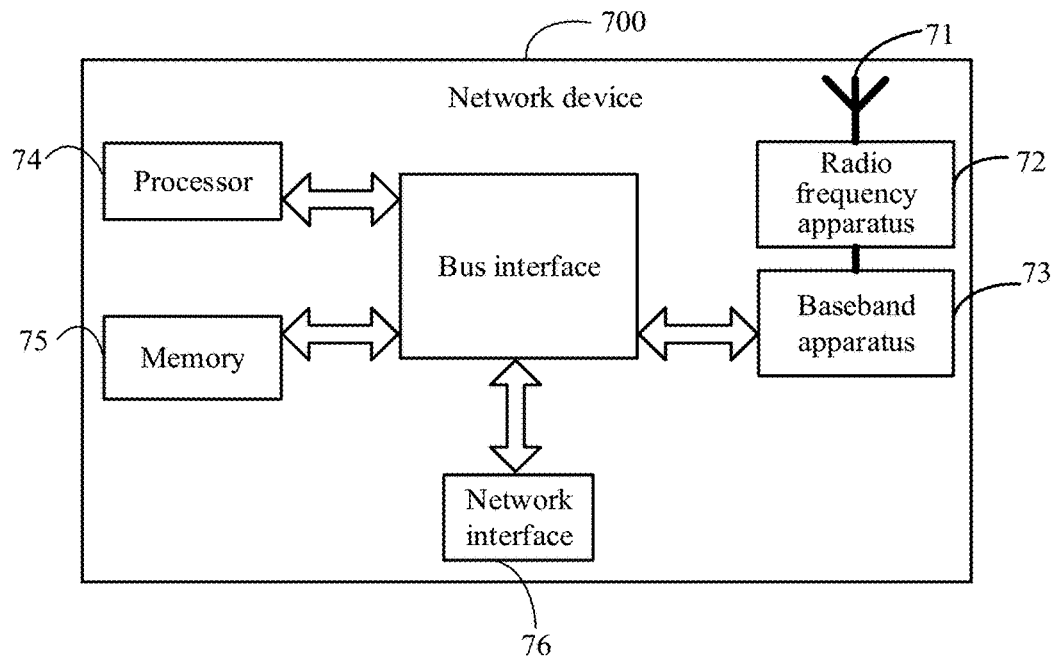

FIG. 8 shows a bitmap with layer 1 and layer 0, where a square with oblique lines indicates a position in which a strongest coefficient is located at this layer.

During division of the quantized coefficients and the bitmaps indicating the quantized coefficients into groups, a bitmap may be first divided into a plurality of information groups, and then based on a bitmap grouping result, the indicated quantized coefficient is placed in the same information group or adjacent information group.

Embodiment 1

Figure 9:
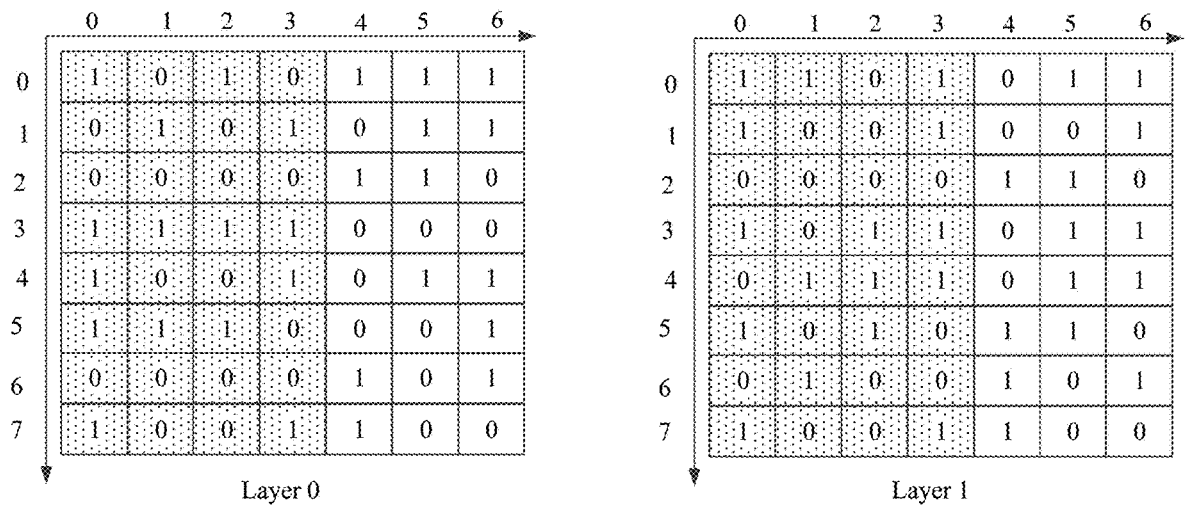

In this embodiment, a bitmap may be divided by column, with a group length being 4. FIG. 9 shows a grouping result of dividing the bitmaps shown in FIG. 8 into groups, where elements in the same pattern are located in the same information group.

In a specific example, an element, corresponding to a strongest coefficient, in the bitmap needs to be mapped to a bit stream. In each of the information groups, a bitmap of each layer is followed by quantized coefficients indicated by the bitmap. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column.

After the bitmaps shown in FIG. 8 are divided into groups, group indexes are assigned to the information subgroups based on column index information of each information subgroup. Information subgroups with the same group index belong to the same information group. The group indexes are sequentially assigned in ascending order of the column index information, to obtain information group 0 and information group 1 as follows:

Information group 0: 10011101, 01010100, 10010100, 01011001, corresponding quantized coefficients, 11010101, 10001010, 00011100, 11011001, corresponding quantized coefficients.

Information group 1: 10100011, 11101000, 11001110, corresponding quantized coefficients, 00100111, 10101100, 11001010, corresponding quantized coefficients.

In another specific example, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column.

After the bitmaps shown in FIG. 8 are divided into groups, group indexes are assigned to the information subgroups based on column index information of each information subgroup. Information subgroups with the same group index belong to the same information group. The group indexes are assigned in ascending order of the column index information, to obtain information group 0 and information group 1 as follows:

Information group 0: 1001111, 01010100, 10010100, 01011001, corresponding quantized coefficient, 1110101, 10001010, 00011100, 11011001, corresponding quantized coefficients.

Information group 1: 10100011, 11101000, 11001110, corresponding quantized coefficient, 00100111, 10101100, 11001010, corresponding quantized coefficients.

In still another specific example, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column.

After the bitmaps shown in FIG. 8 are divided into groups, group indexes are assigned to the information subgroups based on column index information of each information subgroup. Information subgroups with the same group index belong to the same information group. The group indexes are assigned in ascending order of the column index information, to obtain information group 0 and information group 1 as follows:

Information group 0: 1001111, 01010100, 10010100, 01011001, 1110101, 10001010, 00011100, 11011001, corresponding quantized coefficients.

Information group 1: 10100011, 11101000, 11001110, 00100111, 10101100, 11001010, corresponding quantized coefficients.

In yet another specific example, an element, corresponding to a strongest coefficient, in the bitmap is not mapped to a bit stream. In each of the information groups, a bitmap of each layer is followed by quantized coefficients indicated by the bitmap. In each of the information groups, bitmaps of different layers are arranged in ascending order of layer indexes. When elements of one column in the bitmap are mapped to a bit stream, the elements of the column are mapped to a bit stream in descending order of row indexes of the elements in the column.

After the bitmaps shown in FIG. 8 are divided into groups, group indexes are assigned to the information subgroups based on column index information of each information subgroup. Information subgroups with the same group index belong to the same information group. The group indexes are assigned in ascending order of the column index information, to obtain information group 0 and information group 1 as follows:

Information group 0: 1111001, 00101010, 00101001, 10011010, corresponding quantized coefficients, 1010111, 01010001, 00111000, 10011011, corresponding quantized coefficients.

Information group 1: 11000101, 00010111, 01110011, corresponding quantized coefficients, 11100100, 00110101, 01010011, corresponding quantized coefficients.

Embodiment 2

Figure 10:
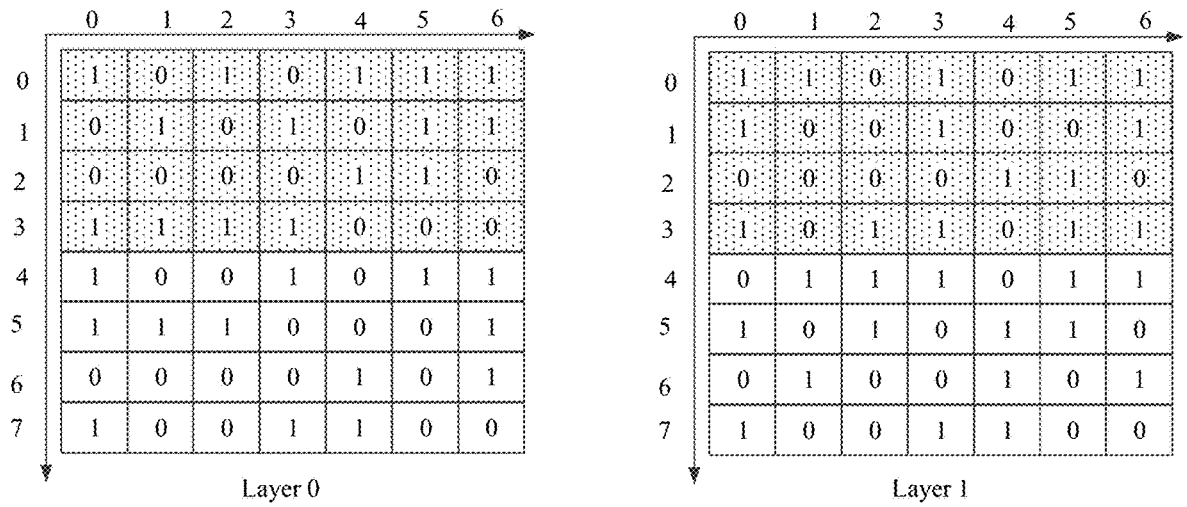

In this embodiment, a bitmap may be divided by row, with a group length being 4. FIG. 10 shows a grouping result of dividing the bitmaps shown in FIG. 8 into groups, where elements in the same color are located in the same information group.

Specifically, an element, corresponding to a strongest coefficient, in the bitmap is not mapped to a bit stream. In each of the information groups, a bitmap of each layer is followed by quantized coefficients indicated by the bitmap. In each of the information groups, bitmaps of different layers are arranged in ascending order of layer indexes. When elements of one row in the bitmap are mapped to a bit stream, the elements of the row are mapped to a bit stream in ascending order of column indexes of the elements in the row.

After the bitmaps shown in FIG. 8 are divided into groups, group indexes are assigned to the information subgroups based on row index information of each information subgroup. Information subgroups with the same group index belong to the same information group. The group indexes are assigned in ascending order of the row index information, to obtain information group 0 and information group 1 as follows:

Information group 0: 1010111, 0101011, 0000110, 1111000, corresponding quantized coefficients, 1101011, 1001001, 000110, 1011000, corresponding quantized coefficients.

Information group 1: 1001011, 1110001, 000101, 1001100, corresponding quantized coefficients, 0111011, 1010110, 0100101, 1001100, corresponding quantized coefficients.

Embodiment 3

Figure 11:
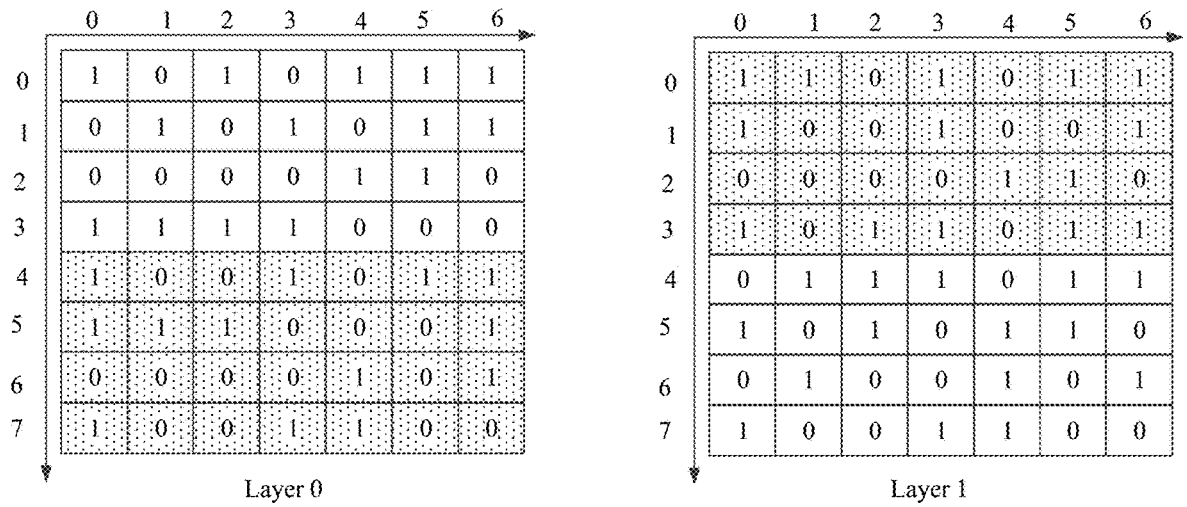

In this embodiment, a bitmap may be divided by row, with a group length being 4. FIG. 11 shows a grouping result of dividing the bitmaps shown in FIG. 8 into groups, where elements in the same color are located in the same information group.

Specifically, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one row in the bitmap are mapped to a bit stream, the elements of the row are mapped to a bit stream in ascending order of column indexes of the elements in the row. A group index of an information subgroup in which a strongest coefficient is located is the smallest.

The bitmaps shown in FIG. 8 are divided into information group 0 and information group 1 as follows:

Information group 0: 1001011, 1110001, 000101, 1001100, 1101011, 1001001, 000110, 1011000, corresponding quantized coefficients.

Information group 1: 1010111, 0101011, 0000110, 1111000, 0111011, 1010110, 0100101, 1001100, corresponding quantized coefficients.

Embodiment 4

Figures 12, 13, 14:
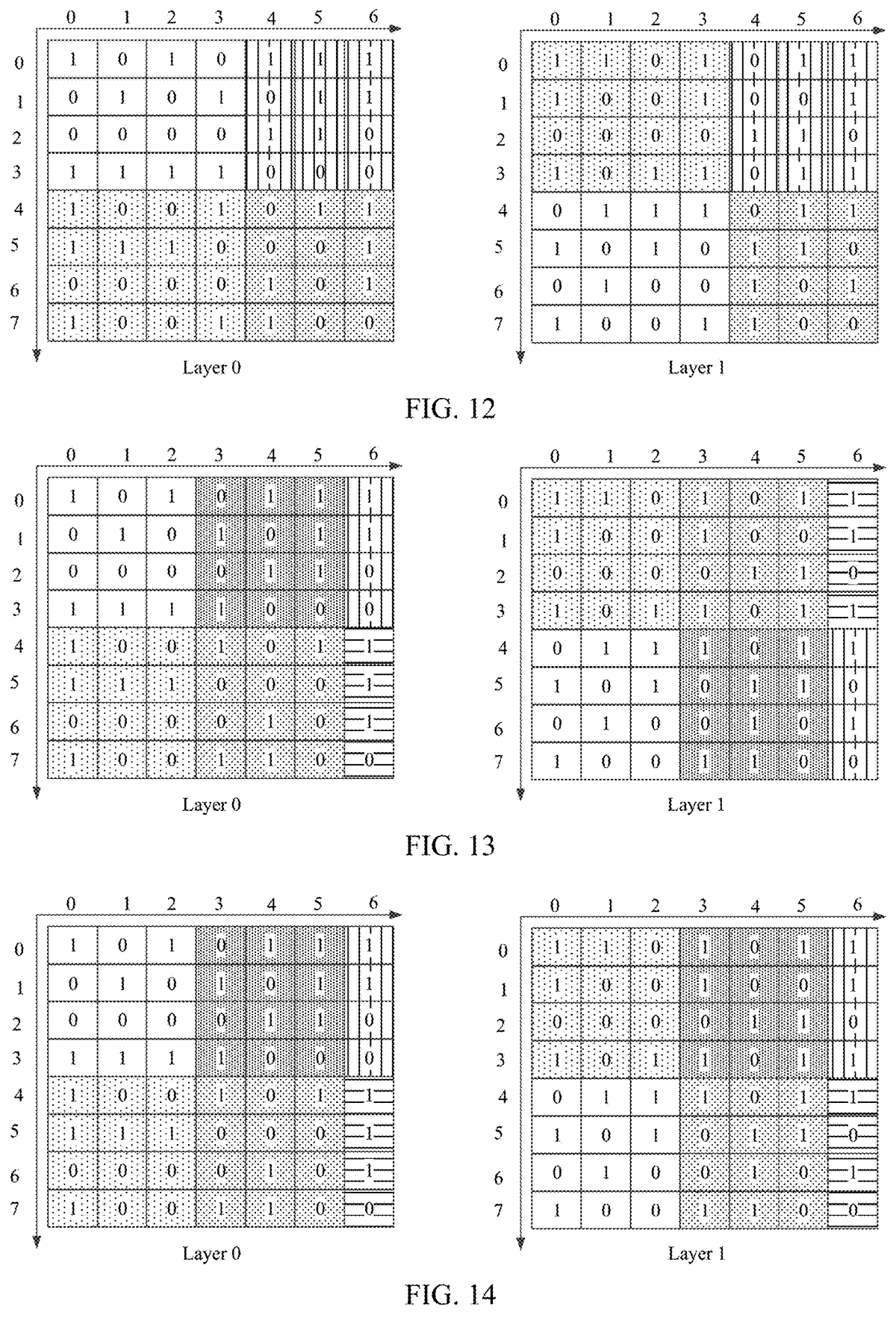

In this embodiment, a bitmap may be divided by row and column, with a group length being 4 in both row and column. The bitmap is divided into a plurality of portions, and is mapped to a bit stream portion by portion. During mapping, elements of each portion are mapped to a bit stream column by column in ascending order of column indexes. FIG. 12 shows a grouping result of dividing the bitmaps shown in FIG. 8 into groups, where elements in the same color are located in the same information group.

Specifically, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column. A group index of an information subgroup in which a strongest coefficient is located is the smallest. After that, information subgroups are sorted based on column index information, and then information subgroups with the same column index information are sorted based on row index information. The row index information includes any one of the following: a sum of row indexes and a minimum row index. The column index information includes any one of the following: a sum of column indexes and a minimum column index.

After the bitmaps shown in FIG. 8 are divided into groups, group indexes are assigned in ascending order of the row index information. In a case of the same row index information, group indexes are assigned in ascending order of the column index information to obtain information group 0 to information group 3 as follows:

Information group 0: 111, 0100, 0100, 1001, 111, 1000, 0001, 1101, corresponding quantized coefficients.

Information group 1: 1001, 0101, 1001, 0101, 0101, 1010, 1100, 1001, corresponding quantized coefficients.

Information group 2: 1010, 1110, 1100, 0111, 1100, 1010, corresponding quantized coefficients.

Information group 3: 0011, 1000, 1110, 0010, 1010, 1100, corresponding quantized coefficients.

Embodiment 5

In this embodiment, a bitmap may be divided by row and column, with a group length being 4 and 3 in row and column, respectively. The bitmap is divided into a plurality of portions, and is mapped to a bit stream portion by portion. During mapping, elements of each portion are mapped to a bit stream column by column in ascending order of column indexes. FIG. 13 shows a grouping result of dividing the bitmaps shown in FIG. 8 into groups, where elements in the same color are located in the same information group.

Specifically, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column. A group index of an information subgroup in which a strongest coefficient is located is the smallest. After that, information subgroups are sorted based on row index information, and then information subgroups with the same row index information are sorted based on column index information. The row index information includes any one of the following: a sum of row indexes and a minimum row index. The column index information includes any one of the following: a sum of column indexes and a minimum column index.

After the bitmaps shown in FIG. 8 are divided into groups, group indexes are assigned in descending order of the row index information. In a case of the same row index information, group indexes are assigned in descending order of the column index information to obtain information group 0 to information group 5 as follows:

Information group 0: 111, 0100, 0100, 1001, 111, 1000, 0001, 1101, corresponding quantized coefficients.

Information group 1: 1001, 0011, 1000, 1101, 0010, 1010, corresponding quantized coefficients.

Information group 2: 1110, 1100, corresponding quantized coefficients.

Information group 3: 1001, 0101, 1001, 0101, 1010, 1100, corresponding quantized coefficients.

Information group 4: 0101, 1010, 1110, 1001, 0111, 1100, corresponding quantized coefficients.

Information group 5: 1100, 1010, corresponding quantized coefficients.

Embodiment 6

In this embodiment, a bitmap may be divided by row and column, with a group length being 4 and 3 in row and column, respectively. The bitmap is divided into a plurality of portions, and is mapped to a bit stream portion by portion. During mapping, elements of each portion are mapped to a bit stream column by column in ascending order of column indexes. FIG. 14 shows a grouping result of dividing the bitmaps shown in FIG. 8 into groups, where elements in the same color are located in the same information group.

Specifically, an element, corresponding to a strongest coefficient, in the bitmap is not mapped to a bit stream. In each of the information groups, bitmaps of all layers are followed by quantized coefficients indicated by the bitmaps. In each of the information groups, bitmaps of different layers are arranged in ascending order of layer indexes. When elements of one column in the bitmap are mapped to a bit stream, the elements of the column are mapped to a bit stream in ascending order of row indexes of the elements in the column. A group index of an information subgroup in which a strongest coefficient is located is the smallest. After that, information subgroups are sorted based on column index information, and then information subgroups with the same column index information are sorted based on row index information. The row index information includes any one of the following: a sum of row indexes and a minimum row index. The column index information includes any one of the following: a sum of column indexes and a minimum column index.

After the bitmaps shown in FIG. 8 are divided into groups, group indexes are assigned in ascending order of the row index information. In a case of the same row index information, group indexes are assigned in ascending order of the column index information to obtain information group 0 to information group 5 as follows:

Information group 0: 111, 0100, 0100, 1001, 111, 1000, 0001, 1101, corresponding quantized coefficients.

Information group 1: 1001, 0101, 1001, 0101, 1010, 1100, corresponding quantized coefficients.

Information group 2: 0101, 1010, 1110, 1101, 0010, 1010, corresponding quantized coefficients.

Information group 3: 1001, 0011, 1000, 1001, 0111, 1100, corresponding quantized coefficients.

Information group 4: 1100, 1100, corresponding quantized coefficients.

Information group 5: 1110, 1010, corresponding quantized coefficients.

The foregoing embodiments describes the method for transmitting a channel state information CSI report in different scenarios, and the following further describes a terminal corresponding to the method with reference to the accompanying drawings.

Figure 3:
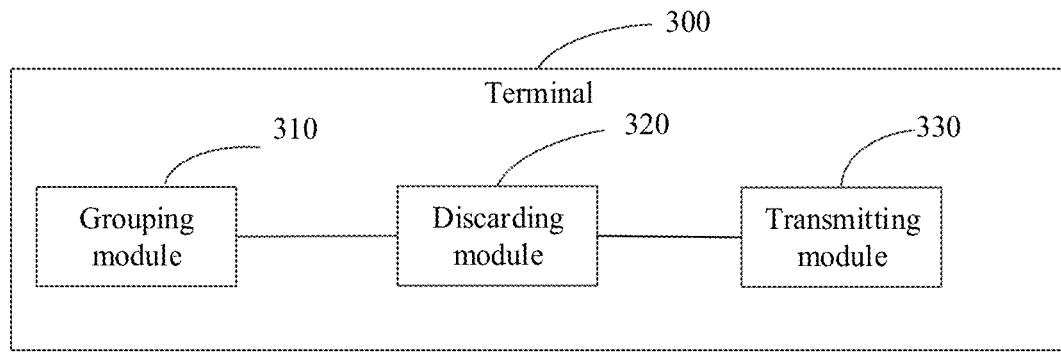
FIG. 3 is a schematic modular structural diagram of a terminal according to an embodiment of this disclosure.

As shown in FIG. 3, a terminal 300 according to an embodiment of this disclosure includes an apparatus for transmitting a CSI report, and is capable of transmitting a channel state information CSI report to a network device in the foregoing embodiment, with the same effects achieved. The terminal 300 specifically includes the following functional modules:

a grouping module 310, configured to divide non-zero quantized coefficients in a compressed coefficient matrix and a bitmap indicating the quantized coefficients into a plurality of information groups;

a discarding module 320, configured to discard, based on priority information preset for information groups, at least one of the following information in the CSI report: the quantized coefficients and the bitmap; and a transmitting module 330, configured to transmit the CSI report with the information discarded.

In this embodiment, the terminal discards, based on the priority information preset for information groups, at least one of the following information in the CSI report: the quantized coefficients and the bitmap; and transmits, to the network device, the CSI report with the information discarded. In this way, the network device can receive and parse the CSI report based on the priority information preset for information groups to determine partial content discarded by the terminal. This helps the network device accurately learn about a channel state, thereby optimizing CSI feedback performance.

Optionally, the apparatus is further configured to obtain an uplink channel resource used for transmitting the CSI report; calculate an uplink channel resource required for transmitting the CSI report; and determine that the uplink channel resource that is obtained is less than a resource required for transmitting the CSI report.

The uplink channel resource includes, but is not limited to, a physical uplink control channel (PUCCH) and/or a physical uplink shared channel (PUSCH), and the like. Optionally, the uplink channel resource may be semi-statically configured for the terminal by the network device by using radio resource control (RRC) signaling, or may be dynamically indicated to the terminal by using a physical downlink control channel (PDCCH).

Optionally, the quantized coefficient includes at least one of the following: an amplitude quantization value and a phase quantization value.

Optionally, the priority information preset for information groups satisfies any one of the following rules:
- a bitmap of each group and quantized coefficients indicated by the bitmap belong to a same information group, and a priority of the bitmap is the same as a priority of the quantized coefficients indicated by the bitmap;
- a bitmap of each group and quantized coefficients indicated by the bitmap belong to a same information group, and a priority of the bitmap is higher than a priority of the quantized coefficients indicated by the bitmap;
- a bitmap of each group and quantized coefficients indicated by the bitmap belong to adjacent information groups, and a priority of the bitmap is higher than a priority of the quantized coefficients indicated by the bitmap; or
- a bitmap of each group and quantized coefficients indicated by the bitmap belong to adjacent information groups, and a priority of the bitmap is lower than a priority of the quantized coefficients indicated by the bitmap.

Optionally, the priority information preset for information groups satisfies any one of the following rules:
- a priority of an information group a is higher than a priority of an information group a+1, where a is greater than or equal to 0 and less than a group quantity, and is an information group index; or
- a priority of an information group a+1 is higher than a priority of an information group a.

Optionally, the grouping module is specifically configured to perform at least one of the following:
- mapping elements of the bitmap to a bit stream column by column, and dividing the bit stream into N information subgroups, where N−1 information subgroups each correspond to elements of P columns in the bitmap, P is a preset group length, and N is equal to ceil(BH/P) or floor(BH/P);
- mapping elements of the bitmap to a bit stream row by row, and dividing the bit stream into N information subgroups, where N−1 information subgroups each correspond to elements of Q rows in the bitmap, Q is a preset group length, and N is equal to ceil(BL/Q) or floor(BL/Q);
- dividing the bitmap into A*B portions, where (A−1)*(B−1) portions include elements of P columns and Q rows; and mapping the bitmap to a bit stream portion by portion, where each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], and floor[(BH/P)*(BL/Q)];
- mapping elements of the bitmap to a bit stream column by column, and dividing the bit stream into N information subgroups, where N−1 information subgroups each include S bits, S is a preset group length, and N is equal to ceil(BS/S) or floor(BS/S); or
- mapping elements of the bitmap to a bit stream row by row, and dividing the bit stream into N information subgroups, where N−1 information subgroups each include S bits, and S is a preset group length.

Optionally, the grouping module is specifically configured to divide a bitmap of each layer into groups, and combine information subgroups of all layers into N information groups, where each information group includes j information subgroups, the j information subgroups belong to different layers, and j is the number of layers.

Optionally, the grouping module is specifically configured to perform at least one of the following:
- mapping quantized coefficients indicated by each information group to the information group; or
- mapping quantized coefficients indicated by each information group to an information group adjacent to the information group.

Optionally, in a case that the bitmap and quantized coefficients indicated by the bitmap belong to a same information group, in each of the information groups, a bitmap of each layer is followed by quantized coefficients indicated by the bitmap or bitmaps at all layers are followed by quantized coefficients indicated by the bitmaps; and
- in a case that the bitmap and quantized coefficients indicated by the bitmap belong to different information groups, a bitmap of each group is followed by quantized coefficients indicated by the bitmap.

Optionally, in each of the information groups, bitmaps of different layers are arranged in any one of the following orders:
- bitmaps of different layers are arranged in ascending order of layer indexes;
- bitmaps of different layers are arranged in descending order of layer indexes; or
- bitmaps of different layers are arranged in a preset order of layer indexes.

Optionally, in a case that BH/P is a non-integer and N is equal to ceil(BH/P), the number of element columns corresponding to any one of the following information subgroups is less than the number of element columns corresponding to other information subgroups:
- the first information subgroup;
- the last information subgroup; or
- an information subgroup in which an element indicating a strongest coefficient is located.

In a case that BH/P is a non-integer and N is equal to floor(BH/P), the number of element columns corresponding to any one of the following information subgroups is greater than the number of element columns corresponding to other information subgroups:
- the first information subgroup;
- the last information subgroup; or
- an information subgroup in which an element indicating a strongest coefficient is located.

In a case that BL/Q is a non-integer and N is equal to ceil(BL/Q), the number of element rows corresponding to any one of the following information subgroups is less than the number of element rows corresponding to other information subgroups:
- the first information subgroup;
- the last information subgroup; or
- an information subgroup in which an element indicating a strongest coefficient is located.

In a case that BL/Q is a non-integer and N is equal to floor(BL/Q), the number of element rows corresponding to any one of the following information subgroups is greater than the number of element rows corresponding to other information subgroups:

the first information subgroup;
the last information subgroup; or
an information subgroup in which an element indicating a strongest coefficient is located.

In a case that BL/Q or BH/P is a non-integer and A*B is equal to ceil(BH/P)*ceil(BL/Q) or ceil[(BH/P)*(BL/Q)], the number of elements corresponding to any one of the following information subgroups or a combination of information subgroups is less than the number of elements corresponding to other information subgroups:
the first information subgroup;
the last information subgroup;
an information subgroup in which an element indicating a strongest coefficient is located; or
an information subgroup in which an element indicating a strongest coefficient is located, and any one of other information subgroups.

In a case that BL/Q or BH/P is a non-integer and A*B is equal to floor(BH/P)*floor(BL/Q) or floor[(BH/P)*(BL/Q)], the number of elements corresponding to any one of the following information subgroups or a combination of information subgroups is greater than the number of elements corresponding to other information subgroups:
the first information subgroup;
the last information subgroup;
an information subgroup in which an element indicating a strongest coefficient is located; or
an information subgroup in which an element indicating a strongest coefficient is located, and any one of other information subgroups.

Optionally, the mapping the bitmap to a bit stream portion by portion includes any one of the following:
mapping elements of each portion to a bit stream column by column in ascending order of column indexes;
mapping elements of each portion to a bit stream column by column in descending order of column indexes;
mapping elements of each portion to a bit stream row by row in ascending order of row indexes; or
mapping elements of each portion to a bit stream row by row in descending order of row indexes.

Optionally, the mapping elements of the bitmap to a bit stream column by column includes any one of the following:
mapping the elements of the bitmap to a bit stream column by column in ascending order of column indexes; or
mapping the elements of the bitmap to a bit stream column by column in descending order of column indexes.

Optionally, mapping elements of one column to a bit stream includes any one of the following:
mapping the elements of the column to a bit stream in descending order of row indexes of the elements of the column; or
mapping the elements of the column to a bit stream in ascending order of row indexes of the elements of the column.

Optionally, the mapping elements of the bitmap to a bit stream row by row includes any one of the following:
mapping the elements of the bitmap to a bit stream row by row in ascending order of row indexes; or
mapping the elements of the bitmap to a bit stream row by row in descending order of row indexes.

Optionally, mapping elements of one row to a bit stream includes any one of the following:
mapping the elements of the row to a bit stream in descending order of column indexes of the elements of the row; or
mapping the elements of the row to a bit stream in ascending order of column indexes of the elements of the row.

Optionally, an element, corresponding to a strongest coefficient, in the bitmap is not mapped to a bit stream.

Optionally, in the case of dividing the bit stream into N groups, where N−1 groups each correspond to elements of P columns in the bitmap, the method further includes assigning a group index to each information subgroup according to any one of the following rules:
assigning a group index to each information subgroup based on a sum of column indexes of all elements corresponding to the information subgroup;
assigning a group index to each information subgroup based on a minimum column index of all elements corresponding to the information subgroup;
defining that an information subgroup in which an element indicating a strongest coefficient is located has a largest a group index, and assigning group indexes to other information subgroups based on a sum of column indexes of all elements corresponding to each information subgroup;
defining that an information subgroup in which an element indicating a strongest coefficient is located has a smallest group index, and assigning group indexes to other information subgroups based on a sum of column indexes of all elements corresponding to each information subgroup;
defining that an information subgroup in which an element indicating a strongest coefficient is located has a largest group index, and assigning group indexes to other information subgroups based on a minimum column index of all elements corresponding to each information subgroup;
defining that an information subgroup in which an element indicating a strongest coefficient is located has a smallest group index, and assigning group indexes to other information subgroups based on a minimum column index of all elements corresponding to each information subgroup;
defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or
defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

Optionally, in the case of dividing the bit stream into N groups, where N−1 groups each correspond to elements of Q rows in the bitmap, the method further includes assigning a group index to each information subgroup according to any one of the following rules:
assigning a group index to each information subgroup based on a sum of row indexes of all elements corresponding to the information subgroup;
assigning a group index to each information subgroup based on a minimum row index of all elements corresponding to the information subgroup;

defining that an information subgroup in which an element indicating a strongest coefficient is located has a largest group index, and assigning group indexes to other information subgroups based on a sum of row indexes of all elements corresponding to each information subgroup;

defining that an information subgroup in which an element indicating a strongest coefficient is located has a smallest group index, and assigning group indexes to other information subgroups based on a sum of row indexes of all elements corresponding to each information subgroup;

defining that an information subgroup in which an element indicating a strongest coefficient is located has a largest group index, and assigning group indexes to other information subgroups based on a minimum row index of all elements corresponding to each information subgroup;

defining that an information subgroup in which an element indicating a strongest coefficient is located has a smallest group index, and assigning group indexes to other information subgroups based on a minimum row index of all elements corresponding to each information subgroup;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

Optionally, in the case of dividing the bitmap into A*B portions and mapping the bitmap to a bit stream portion by portion, where each portion is one information subgroup, the method further includes assigning a group index to each information subgroup according to any one of the following rules:

sorting information subgroups based on row index information and column index information that are of all elements corresponding to the information subgroups, and assigning a group index to each information subgroup based on a sequence of the information subgroups;

defining that an information subgroup in which an element indicating a strongest coefficient is located has a smallest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a largest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

Optionally, sorting information subgroups based on row index information and column index information that are of all elements corresponding to the information subgroups includes any one of the following:

first sorting the information subgroups based on the row index information, and then sorting information subgroups with same row index information based on the column index information; or first sorting the information subgroups based on the column index information, and then sorting information subgroups with same column index information based on the row index information.

The sorting the information subgroups based on the row index information includes any one of the following:

sorting the information subgroups in ascending order of the row index information; or sorting the information subgroups in descending order of the row index information.

The sorting the information subgroups based on the column index information includes any one of the following:

sorting the information subgroups in ascending order of the column index information; or sorting the information subgroups in descending order of the column index information.

Optionally, the row index information includes any one of the following: a sum of row indexes and a minimum row index.

The column index information includes any one of the following: a sum of column indexes and a minimum column index.

Optionally, the information subgroup in which the element indicating the strongest coefficient is located is the $i^{th}$ group, and the sorting other information subgroups by using the information subgroup in which the element indicating the strongest coefficient is located as a start point includes:

in a case that i is equal to 1, a sequence of the other information subgroups is the $(i+1)^{th}$ group, the $(i+2)^{th}$ group, . . . , the $N^{th}$ group;

in a case that i is equal to N, a sequence of the other information subgroups is the $1^{st}$ group, the $2^{nd}$ group, . . . , the $(N-1)^{th}$ group; or in a case that i is greater than 1 and less than N, a sequence of the other information subgroups is any one of the following:

the $(i+1)^{th}$ group, . . . , the $N^{th}$ group, the $1^{st}$ group, the $2^{nd}$ group, . . . , the $(i-1)^{th}$ group; or the $1^{st}$ group, . . . , the $(i-1)^{th}$ group; the $(i+1)^{th}$ group; . . . , the $N^{th}$ group.

Optionally, in a case that a value of N is 2, any one of the following is used:
- a priority of an information subgroup in which an element indicating a strongest coefficient is located is higher than a priority of the other information group; or
- a priority of an information subgroup in which an element indicating a strongest coefficient is located is lower than a priority of the other information group.

Optionally, the group length is determined in any one of the following manners:
- being specified by a protocol;
- being configured by the network device; and
- being configured by the terminal and reported to the network device;
- being equal to the number of spatial domain beams that is configured by the network device; and
- being obtained through calculation based on a group coefficient, where the group coefficient is greater than or equal to 0 and less than or equal to 1.

Optionally, the group coefficient is determined in any one of the following manners:
- being specified by the protocol;
- being configured by the network device; and
- being configured by the terminal and reported to the network device.

Optionally, in a case that the group length is obtained through calculation based on the group coefficient, the group length is obtained through calculation in any one of the following manners:
- the group length=ceil(the group coefficient*dimension), where the dimension is equal to a row or column length of the bitmap;
- the group length=floor(the group coefficient*dimension), where the dimension is equal to a row or column length of the bitmap;
- the group length=floor(the group coefficient*BS); or
- the group length=ceil(the group coefficient*BS).

Figure 4:
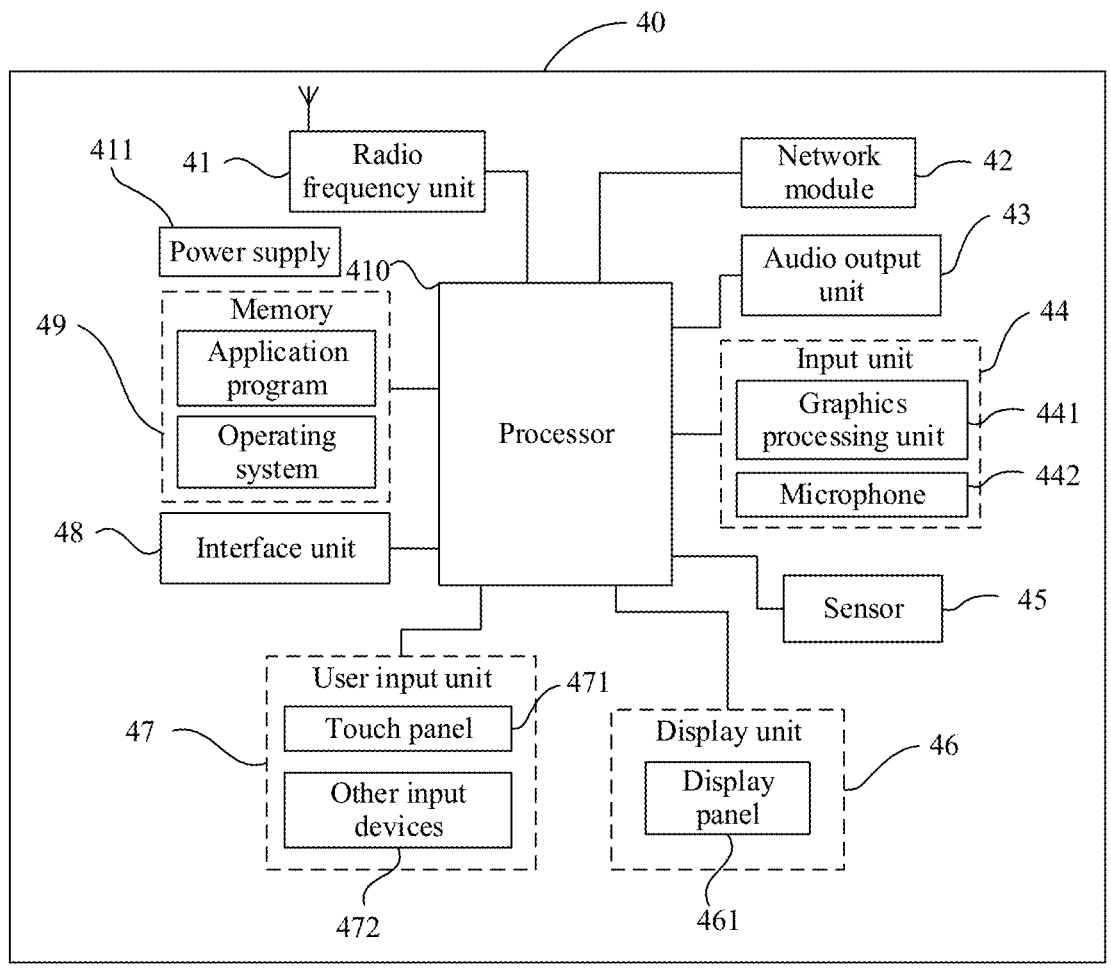
FIG. 4 is a block diagram of a terminal according to an embodiment of this disclosure.

To better achieve the foregoing objective, further, FIG. 4 is a schematic diagram of a hardware structure of a terminal for implementing each embodiment of the present disclosure. The terminal 40 includes, but is not limited to, components such as a radio frequency unit 41, a network module 42, an audio output unit 43, an input unit 44, a sensor 45, a display unit 46, a user input unit 47, an interface unit 48, a memory 49, a processor 410, and a power supply 411. A person skilled in the art may understand that the structure of the terminal shown in FIG. 4 does not constitute any limitation on the terminal device. The terminal may include more or fewer components than those shown in the figure, or a combination of some components, or the components disposed differently. In this embodiment of this disclosure, the terminal includes, but is not limited to, a mobile phone, a tablet computer, a laptop computer, a personal digital assistant, an in-vehicle terminal, a wearable device, a pedometer, and the like.

The radio frequency unit 41 is configured to transmit a channel state information CSI report to a network device.

The processor 410 is configured to divide non-zero quantized coefficients in a compressed coefficient matrix and a bitmap indicating the quantized coefficients into a plurality of information groups; and
  discard, based on priority information preset for information groups, at least one of the following information in the CSI report: the quantized coefficients and the bitmap.

It should be understood that, in this embodiment of this disclosure, the radio frequency unit 41 may be configured to: receive and transmit signals in an information receiving/transmitting process or a call process; and specifically, after receiving downlink data from a base station, transmit the downlink information to the processor 410 for processing, and in addition, transmit uplink data to the base station. Generally, the radio frequency unit 41 includes, but is not limited to, an antenna, at least one amplifier, a transceiver, a coupler, a low noise amplifier, a duplexer, and the like. In addition, the radio frequency unit 41 may also communicate with a network and other devices via a wireless communications system.

The terminal provides a user with wireless broadband internet access through the network module 42, for example, helping the user to transmit and receive e-mails, browse web pages, and access streaming media.

The audio output unit 43 may convert audio data received by the radio frequency unit 41 or the network module 42 or stored in the memory 49 into an audio signal and output the audio signal as a sound. Furthermore, the audio output unit 43 may also provide audio output (for example, a call signal received sound or a message received sound) related to a specific function performed by the terminal 40. The audio output unit 43 includes a speaker, a buzzer, a receiver, and the like.

The input unit 44 is configured to receive an audio or video signal. The input unit 44 may include a graphics processing unit (GPU) 441 and a microphone 442. The graphics processing unit 441 processes image data of a still picture or video obtained by an image capture apparatus (such as a camera) in a video capture mode or an image capture mode. A processed image frame may be displayed on the display unit 46. The image frame processed by the graphics processing unit 441 may be stored in the memory 49 (or another storage medium) or be transmitted by the radio frequency unit 41 or the network module 42. The microphone 442 is capable of receiving sounds and processing such sounds into audio data. The processed audio data may be converted in a telephone call mode into a format that can be transmitted by the radio frequency unit 41 to a mobile communications base station, for outputting.

The mobile terminal 40 may further include at least one sensor 45, for example, a light sensor, a motion sensor, and another sensor. Specifically, the optical sensor may include an ambient light sensor and a proximity sensor. The ambient light sensor may adjust luminance of the display panel 461 based on brightness of ambient light, and the proximity sensor may turn off the display panel 461 and/or backlight when the terminal 40 moves close to an ear. As a motion sensor, an accelerometer sensor may detect the magnitude of acceleration in each direction (generally three axes), and in a stationary state, may detect the magnitude and direction of gravity, and may be used to recognize terminal postures (for example, shift between a landscape orientation and a portrait orientation, related games, and magnetometer posture calibration), and vibration recognition-related functions (such as a pedometer and knocking), and the like. The sensor 45 may further include a fingerprint sensor, a pressure sensor, an iris sensor, a molecular sensor, a gyroscope, a barometer, a hygrometer, a thermometer, an infrared sensor, and the like. Details are not described herein again.

The display unit 46 is configured to display information input by the user or information provided to the user. The display unit 46 may include a display panel 461, and the display panel 461 may be configured in a form of a liquid crystal display (LCD), an organic light-emitting diode (OLED), or the like.

The user input unit 47 may be configured to: receive a digit or character information that is input, and generate signal input related to user settings and function control of the terminal. Specifically, the user input unit 47 may include a touch panel 471 and other input devices 472. The touch panel 471 is also referred to as a touchscreen and can collect a touch operation (such as an operation performed by the user on the touch panel 471 or near the touch panel 471 with a finger or by using any proper object or accessory such as a stylus) of the user on or near the touch panel 471. The touch panel 471 may include two parts: a touch detection apparatus and a touch controller. The touch detection apparatus detects a touch azimuth of a user, detects a signal brought by a touch operation, and transmits the signal to the touch controller. The touch controller receives touch information from the touch detection apparatus, converts the touch information into touchpoint coordinates, and transmits the touchpoint coordinates to the processor 410, and can receive a command transmitted by the processor 410 and execute the command. In addition, the touch panel 471 may be implemented in a plurality of forms, for example, as a resistive, capacitive, infrared, or surface acoustic wave touch panel. In addition to the touch panel 471, the user input unit 47 may further include other input devices 472. Specifically, the other input devices 472 may include but are not limited to a physical keyboard, a function key (such as a volume control key or an on/off key), a trackball, a mouse, and a joystick. Details are not described herein.

Further, the touch panel 471 may cover the display panel 461. When detecting a touch operation on or near the touch panel 471, the touch panel 471 transmits the touch operation to the processor 410 to determine a type of a touch event. Then, the processor 410 provides a corresponding visual output on the display panel 461 based on the type of the touch event. In FIG. 4, the touch panel 471 and the display panel 461 serve as two independent components to implement input and output functions of the terminal. In some embodiments, however, the touch panel 471 may be integrated with the display panel 461 to implement the input and output functions of the terminal. Details are not limited herein.

The interface unit 48 is an interface between an external apparatus and the terminal 40. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 48 may be configured to: receive input (for example, data information and power) from the external apparatus, and transmit the received input to one or more elements in the terminal 40, or may be configured to transmit data between the terminal 40 and the external apparatus.

The memory 49 may be configured to store software programs and various data. The memory 49 may primarily include a program storage area and a data storage area. The program storage area may store an operating system, an application (such as an audio play function and an image play function) required by at least one function, and the like. The data storage area may store data (such as audio data and a phone book) created based on use of the mobile phone. In addition, the memory 49 may include a high-speed random access memory, and may further include a non-volatile memory such as at least one disk storage device, a flash memory device, or another volatile solid-state storage device.

The processor 410 is a control center of the terminal, and is connected to all components of the terminal by using various interfaces and lines. By running or executing a software program and/or module that is stored in the memory 49 and calling data stored in the memory 49, the processor 410 executes various functions of the terminal and processes data, so as to perform overall monitoring on the terminal.

The processor 410 may include one or more processing units. Optionally, an application processor and a modem processor may be integrated in the processor 410. The application processor primarily processes an operating system, user interfaces, application programs, and the like. The modem processor primarily processes radio communication. It can be understood that the modem processor may alternatively be not integrated in the processor 410.

The terminal 40 may further include the power supply 411 (for example, a battery) supplying power to all components. Optionally, the power supply 411 may be logically connected to the processor 410 through a power management system. In this way, functions such as charge management, discharge management, and power consumption management are implemented by using the power management system.

In addition, the terminal 40 includes some functional modules that are not illustrated. Details are not described herein.

Optionally, an embodiment of this disclosure further provides a terminal, including a processor 410, a memory 49, and a computer program stored in the memory 49 and running on the processor 410. When the computer program is executed by the processor 410, the processes of the foregoing embodiment of the method for transmitting a channel state information CSI report can be implemented, with same technical effects achieved. To avoid repetition, details are not described herein again. The terminal may be a wireless terminal or a wired terminal. The wireless terminal may be a device that provides a user with voice and/or other service data connectivity, a handheld device with a wireless connection function, or another processing device connected to a wireless modem. A wireless terminal may communicate with one or more core networks through a radio access network (RAN). The wireless terminal may be a mobile terminal, such as a mobile phone (or referred to as a "cellular" phone) or a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, a remote terminal, an access terminal, a user terminal, a user agent, or a user device (User Device or User Equipment), which is not limited herein.

An embodiment of this disclosure further provides a computer-readable storage medium, where a computer program is stored in the computer readable storage medium. When the computer program is executed by a processor, the processes of the foregoing embodiment of the method for transmitting a channel state information CSI report can be implemented, with same technical effects achieved. To avoid repetition, details are not described herein again. The computer-readable storage medium is, for example, a read-only memory (ROM), a random access memory (RAM), a magnetic disk, or an optical disc.

The foregoing embodiment describes the method for transmitting a channel state information CSI report in this disclosure from perspective of a terminal side, and the following embodiment further describes the method for transmitting a channel state information CSI report from perspective of a network device side with reference to the accompanying drawings.

Figure 5:
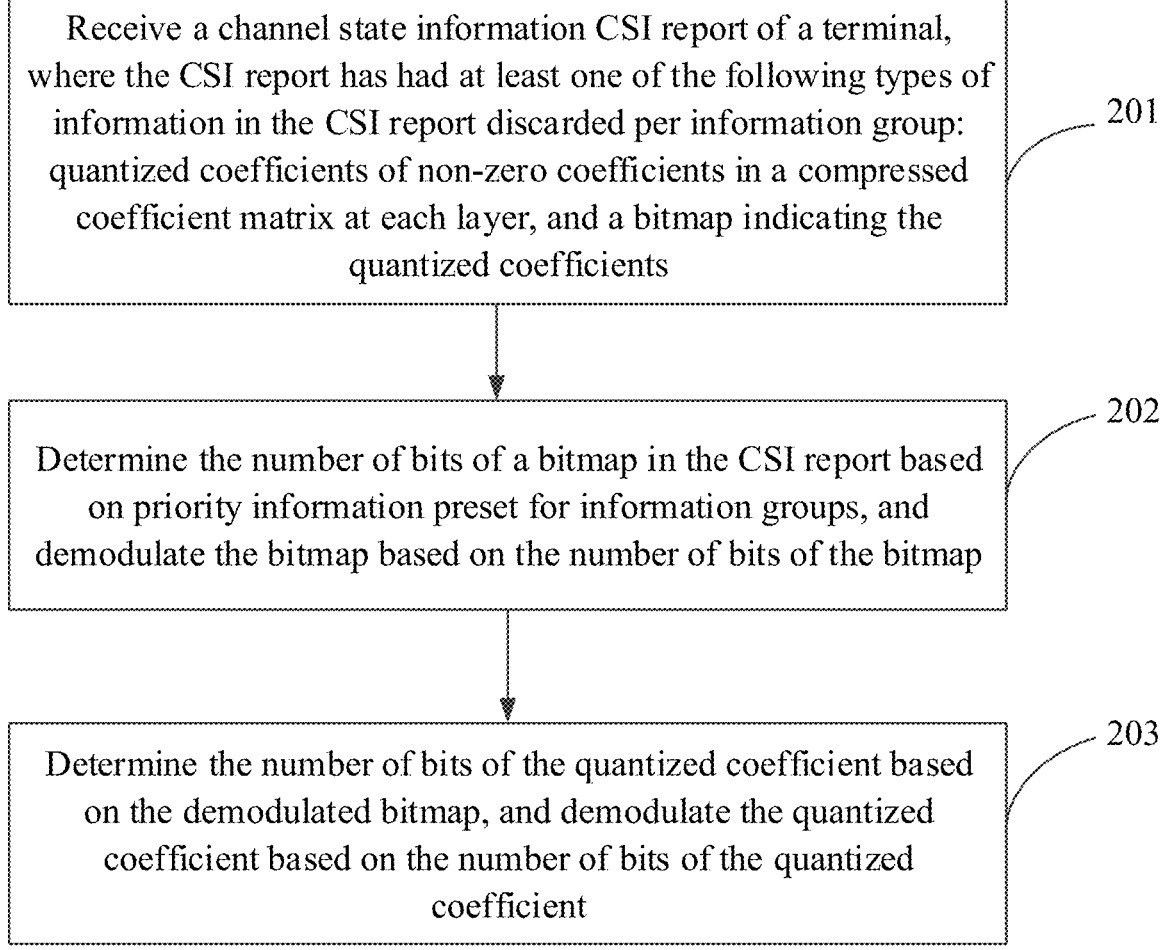
FIG. 5 is a schematic flowchart of a method for transmitting a CSI report from the perspective of a network device according to an embodiment of this disclosure.

As shown in FIG. 5, an embodiment of this disclosure provides a method of transmitting a channel state information CSI report applied to a network device side. The method may include the following steps.

Step 201: Receive a channel state information CSI report of a terminal, where the CSI report has at least one of the following information in the CSI report discarded: non-zero quantized coefficients in a compressed coefficient matrix at each layer, and a bitmap indicating the quantized coefficients.

Step 202: Determine the number of bits of a bitmap in the CSI report based on priority information preset for information groups, and demodulate the bitmap based on the number of bits of the bitmap.

Step 203: Determine the number of bits of the quantized coefficient based on the demodulated bitmap, and demodulate the quantized coefficient based on the number of bits of the quantized coefficient.

In this embodiment, the network device can receive and parse the CSI report based on the priority information preset for information groups to determine content in the CSI report. This helps the network device accurately learn about a channel state, thereby optimizing CSI feedback performance.

Based on a configured uplink channel resource, a CSI parameter configured by the network device, and information carried in part 1 of a CSI report, the network device decodes part 2 to a bit level after receiving the CSI report. A portion in part 2 other than bitmaps and quantized coefficients can be obtained based on part 1 and CSI parameter information configured by the network device. For the remaining portion of part 2, that is, the bitmap and quantized coefficient portion, the included bitmap and corresponding quantized coefficients are determined sequentially in descending order of priorities based on priority information of corresponding information groups.

Optionally, the quantized coefficient includes at least one of the following: an amplitude quantization value and a phase quantization value.

Optionally, the priority information preset for information groups satisfies any one of the following rules:
  a bitmap of each group and quantized coefficients indicated by the bitmap belong to a same information group, and a priority of the bitmap is the same as a priority of the quantized coefficients indicated by the bitmap;
  a bitmap of each group and quantized coefficients indicated by the bitmap belong to a same information group, and a priority of the bitmap is higher than a priority of the quantized coefficients indicated by the bitmap;
  a bitmap of each group and quantized coefficients indicated by the bitmap belong to adjacent information groups, and a priority of the bitmap is higher than a priority of the quantized coefficients indicated by the bitmap; or
  a bitmap of each group and quantized coefficients indicated by the bitmap belong to adjacent information groups, and a priority of the bitmap is lower than a priority of the quantized coefficients indicated by the bitmap.

Optionally, the priority information preset for information groups satisfies any one of the following rules:
  a priority of an information group a is higher than a priority of an information group a+1, where a is greater than or equal to 0 and less than a group quantity, and is an information group index; or
  a priority of an information group a+1 is higher than a priority of an information group a.

Optionally, in a case that the bitmap and quantized coefficients indicated by the bitmap belong to a same information group, in each of the information groups, a bitmap of each layer is followed by quantized coefficients indicated by the bitmap or bitmaps of all layers are followed by quantized coefficients indicated by the bitmaps; and
  in a case that the bitmap and quantized coefficients indicated by the bitmap belong to different information groups, a bitmap of each group is followed by quantized coefficients indicated by the bitmap.

Optionally, in each of the information groups, bitmaps of different layers are arranged in any one of the following orders:
  bitmaps of different layers are arranged in ascending order of layer indexes;
  bitmaps of different layers are arranged in descending order of layer indexes; or
  bitmaps of different layers are arranged in a preset order of layer indexes.

The method for transmitting a channel state information CSI report in different scenarios is separately described in detail in the foregoing embodiments. A network device corresponding to the method for transmitting a channel state information CSI report is further described in the following embodiment with reference to an accompanying drawing.

Figure 6:
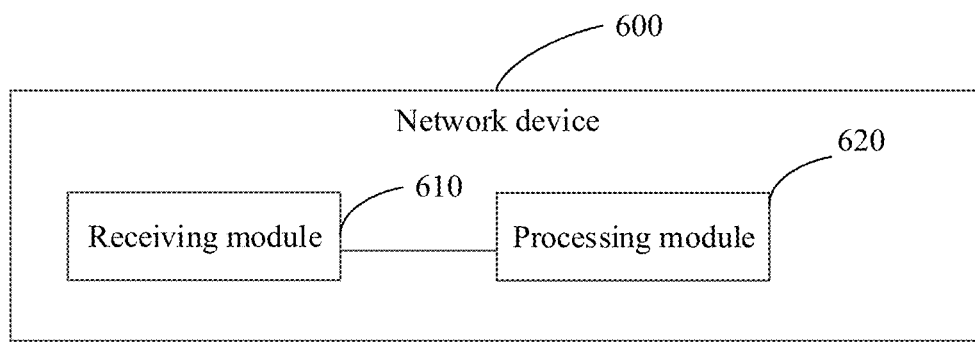
FIG. 6 is a schematic modular structural diagram of a network device according to an embodiment of this disclosure.

As shown in FIG. 6, a network device 600 according to an embodiment of this disclosure includes an apparatus for transmitting a CSI report, and is capable of receiving a channel state information CSI report in the foregoing embodiment, with the same effects achieved. The network device 600 specifically includes the following functional modules:
  a receiving module 610, configured to receive a channel state information CSI report of a terminal, where the CSI report has at least one of the following information in the CSI report discarded: non-zero quantized coefficients in a compressed coefficient matrix at each layer, and a bitmap indicating the quantized coefficients; and
  a processing module 620, configured to determine the number of bits of a bitmap in the CSI report based on priority information preset for information groups, and demodulate the bitmap based on the number of bits of the bitmap; and determine the number of bits of the quantized coefficient based on the demodulated bitmap, and demodulate the quantized coefficient based on the number of bits of the quantized coefficient.

Optionally, the quantized coefficient includes at least one of the following: an amplitude quantization value and a phase quantization value.

Optionally, the priority information preset for information groups satisfies any one of the following rules:
  a bitmap of each group and quantized coefficients indicated by the bitmap belong to a same information group, and a priority of the bitmap is the same as a priority of the quantized coefficients indicated by the bitmap;

a bitmap of each group and quantized coefficients indicated by the bitmap belong to a same information group, and a priority of the bitmap is higher than a priority of the quantized coefficients indicated by the bitmap;

a bitmap of each group and quantized coefficients indicated by the bitmap belong to adjacent information groups, and a priority of the bitmap is higher than a priority of the quantized coefficients indicated by the bitmap; or a bitmap of each group and quantized coefficients indicated by the bitmap belong to adjacent information groups, and a priority of the bitmap is lower than a priority of the quantized coefficients indicated by the bitmap.

Optionally, the priority information preset for information groups satisfies any one of the following rules:

a priority of an information group a is higher than a priority of an information group a+1, where a is greater than or equal to 0 and less than a group quantity, and is an information group index; or a priority of an information group a+1 is higher than a priority of an information group a.

Optionally, in a case that the bitmap and quantized coefficients indicated by the bitmap belong to a same information group, in each of the information groups, a bitmap of each layer is followed by quantized coefficients indicated by the bitmap or bitmaps of all layers are followed by quantized coefficients indicated by the bitmaps; and in a case that the bitmap and quantized coefficients indicated by the bitmap belong to different information groups, a bitmap of each group is followed by quantized coefficients indicated by the bitmap.

Optionally, in each of the information groups, bitmaps of different layers are arranged in any one of the following orders:

bitmaps of different layers are arranged in ascending order of layer indexes;

bitmaps of different layers are arranged in descending order of layer indexes; or bitmaps of different layers are arranged in a preset order of layer indexes.

It should be noted that, it should be understood that division of modules of the network device and the terminal is merely logical function division. The modules may be all or partially integrated in a physical entity or may be physically separate in an actual implementation. In addition, the modules may be all implemented in a form of software invoked by a processing component, or may be all implemented in a form of hardware; or a part of modules may be implemented in a form of software invoked by a processing component, and another part of modules may be implemented in a form of hardware. For example, a determining module may be a processing component that is separately disposed, or may be integrated in a chip of the apparatus for implementation. In addition, the determining module may be stored in the memory of the apparatus in a form of program code, and is invoked by a processing component of the apparatus to perform a function of the determining module. Implementation of other modules is similar to this. In addition, the modules may be all or partially integrated, or may be implemented independently. Herein, the processing component may be an integrated circuit, and has a signal processing capability. In an implementation process, steps in the foregoing method or the foregoing modules can be implemented by using a hardware integrated logical circuit in the processor component, or by using instructions in a form of software.

For example, the foregoing modules may be configured as one or more integrated circuits that implement the foregoing methods, such as one or more application-specific integrated circuits (ASIC), one or more microprocessors (digital signal processor, DSP), or one or more field programmable gate arrays FPGA). For another example, when one of the foregoing modules is implemented by invoking program code by the processing element, the processing element may be a general-purpose processor, such as a central processing unit (CPU), or another processor that can invoke the program code. For still another example, these modules may be integrated together and implemented in a system-on-a-chip (SOC) form.

To better achieve the foregoing objective, an embodiment of this disclosure further provides a network device. The network device includes a processor, a memory, and a computer program stored in the memory and capable of running on the processor, where when the computer program is executed by the processor, the steps of the foregoing method for transmitting a channel state information CSI report are implemented, with same technical effects achieved. To avoid repetition, details are not described herein again.

An embodiment of this disclosure further provides a computer-readable storage medium, where a computer program is stored in the computer readable storage medium. When the computer program is executed by a processor, the steps of the foregoing embodiment of the method for transmitting a channel state information CSI report can be implemented, with same technical effects achieved. To avoid repetition, details are not described herein again.

Specifically, an embodiment of this disclosure further provides a network device. As shown in FIG. 7, the network device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and transmits the received information to the baseband apparatus 73 for processing. In a downlink direction, the baseband apparatus 73 processes to-be-sent information, and sends the information to the radio frequency apparatus 72; and the radio frequency apparatus 72 processes the received information and then sends the information out by using the antenna 71.

The frequency band processing apparatus may be located in the baseband apparatus 73. The method performed by the network device in the foregoing embodiment may be implemented in the baseband apparatus 73, and the baseband apparatus 73 includes a processor 74 and a memory 75.

The baseband apparatus 73 may include, for example, at least one baseband processing unit, where a plurality of chips are disposed on the baseband processing unit. As shown in FIG. 7, one of the chips is, for example, the processor 74, connected to the memory 75, to invoke a program in the memory 75 to perform the operation of the network device shown in the foregoing method embodiment.

The baseband apparatus 73 may further include a network interface 76, configured to exchange information with the radio frequency apparatus 72, where the interface is, for example, a common public radio interface (CPRI).

Herein, the processor may be one processor, or may be a collective term for a plurality of processing components. For example, the processor may be a CPU, or may be an ASIC, or is configured as one or more integrated circuits for implementing the method performed by the network device, for example, one or more microprocessors DSPs, or one or more field programmable gate arrays FPGAs. A storage component may be a memory, or may be a collective term for a plurality of storage components.

The memory 75 may be a volatile memory or a non-volatile memory, or may include a volatile memory and a non-volatile memory. The non-volatile memory may be a read-only memory (ROM), a programmable read only memory (Programmable ROM, PROM), an erasable programmable read-only memory (Erasable PROM, EPROM), and an electrically erasable programmable read-only memory (Electrically EPROM, EEPROM), or flash memory. The volatile memory may be a random access memory (RAM), which is used as an external cache. As exemplary rather than restrictive description, many forms of RAM can be used, such as a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDRSDRAM), an enhanced synchronous dynamic random access memory (Enhanced SDRAM, ESDRAM), a synchronous link dynamic random access memory (Synchlink DRAM, SLDRAM), and a direct Rambus random access memory (Direct Rambus RAM, DRRAM). The memory 75 described in this disclosure is intended to include but is not limited to these and any other suitable memories.

Specifically, the network device in the embodiments of this disclosure further includes a computer program stored in the memory 75 and capable of running on the processor 74. The processor 74 invokes the computer program in the memory 75 to perform the method performed by the modules shown in FIG. 6.

Specifically, when being invoked by the processor 74, the computer program can be configured to perform the following: receiving a channel state information CSI report of a terminal; and determining, based on priority information preset for information groups, at least one of the following information in the CSI report: non-zero quantized coefficients in a compressed coefficient matrix at each layer and a bitmap indicating the quantized coefficients.

A person of ordinary skill in the art may be aware that the units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described again herein.

In the embodiments provided in this disclosure, it should be understood that the disclosed apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network elements. Some or all of the units may be selected based on actual requirements to achieve the objectives of the solutions of the embodiments.

In addition, functional units in the embodiments of this disclosure may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this disclosure essentially, or the part contributing to the prior art, or some of the technical solutions may be implemented in a form of a software product. The software product is stored in a storage medium, and includes several instructions for instructing a computer device (which may be a personal computer, a server, a network device, or the like) to perform all or some of the steps of the method described in the embodiments of this disclosure. The foregoing storage medium includes: any medium that can store program code, such as a USB flash drive, a removable hard disk, a ROM, a RAM, a magnetic disk, or an optical disc.

In addition, it should be noted that in the apparatus and method of the present disclosure, apparently, the components or steps may be decomposed and/or recombined. Such decomposition and/or recombination should be considered as an equivalent solution of this disclosure. Further, the steps of performing the aforementioned series of processing may be naturally performed in an order of the description or in a time order, but is not necessarily performed in a time order. Some steps may be performed in parallel or independently of each other. Those of ordinary skill in the art can understood that all or any steps or components of the method and apparatus of this disclosure can be implemented by hardware, firmware, software, or a combination thereof in any computing apparatus (including a processor, a storage medium, and the like) or a network with a computing apparatus. This can be implemented by those of ordinary skill in the art by using their basic programming skills in the case of reading this disclosure.

Therefore, the objectives of this disclosure can also be implemented by running a program or a set of programs on any computing apparatus. The computing apparatus may be a well-known general-purpose apparatus. Therefore, the objectives of this disclosure may also be implemented only by a program product that contains program code for implementing the method or apparatus. That is, such program product also constitutes this disclosure, and a storage medium storing such program product also constitutes this disclosure. Obviously, the storage medium may be any known storage medium or any storage medium developed in the future. It should be also noted that, in the apparatus and method of this disclosure, obviously, the components or steps can be decomposed and/or recombined. Such decomposition and/or recombination should be considered as an equivalent solution of this disclosure. Further, the steps of performing the aforementioned series of processing may be naturally performed in an order of the description or in a time order, but is not necessarily performed in a time order. Some steps may be performed in parallel or independently of each other.

The foregoing descriptions are optional implementations of this disclosure. It should be noted that a person of ordinary skill in the art may make several improvements and polishing without departing from the principle described in this disclosure and the improvements and polishing shall fall within the protection scope of this disclosure.

What is claimed is:

1. A method for transmitting a channel state information (CSI) report, applied to a terminal side and comprising:
   dividing non-zero quantized coefficients in a compressed coefficient matrix and a bitmap indicating the quantized coefficients into a plurality of information groups;
   discarding, based on priority information preset for information groups, at least one of the following information in the CSI report: the quantized coefficients or the bitmap; and
   transmitting the CSI report with the information discarded;
   wherein dividing the bitmap into groups comprises dividing a bitmap of each layer into groups, and the dividing a bitmap of each layer into groups comprises any one of the following:
   mapping elements of the bitmap to a bit stream column by column, and dividing the bit stream into N information subgroups, wherein N−1 information subgroups each correspond to elements of P columns in the bitmap, P is a preset group length, N is equal to ceil(BH/P) or floor(BH/P), ceil is round up, floor is round down, and BH is the number of columns in the bitmap;
   mapping elements of the bitmap to a bit stream row by row, and dividing the bit stream into N information subgroups, wherein N−1 information subgroups each correspond to elements of Q rows in the bitmap, Q is a preset group length, N is equal to ceil(BL/Q) or floor(BL/Q), and BL is the number of rows in the bitmap;
   dividing the bitmap into A*B portions, wherein (A−1)*(B−1) portions comprise elements of P columns and Q rows; and mapping the bitmap to a bit stream portion by portion, wherein each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], or floor[(BH/P)*(BL/Q)];
   mapping elements of the bitmap to a bit stream column by column, and dividing the bit stream into N information subgroups, wherein N−1 information subgroups each comprise S bits, S is a preset group length, N is equal to ceil(BS/S) or floor(BS/S), and BS is a total number of bits in the bitmap; or
   mapping elements of the bitmap to a bit stream row by row, and dividing the bit stream into N information subgroups, wherein N−1 information subgroups each comprise S bits, and S is a preset group length.

2. The method for transmitting a CSI report according to claim 1, wherein before the information in the CSI report is discarded, the method further comprises:
   obtaining an uplink channel resource used for transmitting the CSI report;
   calculating an uplink channel resource required for transmitting the CSI report; and
   determining that the uplink channel resource that is obtained is less than a resource required for transmitting the CSI report.

3. The method for transmitting a CSI report according to claim 1, wherein the quantized coefficient comprises at least one of the following: an amplitude quantization value or a phase quantization value.

4. The method for transmitting a CSI report according to claim 1, wherein the priority information preset for information groups satisfies any one of the following rules:
   a bitmap of each group and quantized coefficients indicated by the bitmap belong to a same information group, and a priority of the bitmap is the same as a priority of the quantized coefficients indicated by the bitmap;
   a bitmap of each group and quantized coefficients indicated by the bitmap belong to a same information group, and a priority of the bitmap is higher than a priority of the quantized coefficients indicated by the bitmap;
   a bitmap of each group and quantized coefficients indicated by the bitmap belong to adjacent information groups, and a priority of the bitmap is higher than a priority of the quantized coefficients indicated by the bitmap; or
   a bitmap of each group and quantized coefficients indicated by the bitmap belong to adjacent information groups, and a priority of the bitmap is lower than a priority of the quantized coefficients indicated by the bitmap.

5. The method for transmitting a CSI report according to claim 1, wherein the priority information preset for information groups satisfies any one of the following rules:
   a priority of an information group a is higher than a priority of an information group a+1, wherein a is greater than or equal to 0 and less than a group quantity, and is an information group index; or
   a priority of an information group a+1 is higher than a priority of an information group a.

6. The method for transmitting a CSI report according to claim 1, wherein after division of the bitmap of each layer into groups, information subgroups of all layers are combined into N information groups, wherein each information group comprises j information subgroups, the j information subgroups belong to different layers, and j is the number of layers.

7. The method for transmitting a CSI report according to claim 6, wherein that the information subgroups of all layers are combined into N information groups comprises:
   assigning group indexes to information subgroups of each layer separately, wherein information subgroups with a same group index belong to a same information group, and a group index of an information group is equal to a group index of an information subgroup contained therein.

8. The method for transmitting a CSI report according to claim 7, wherein dividing the quantized coefficients into groups comprises any one of the following:
   mapping quantized coefficients indicated by each information group to the information group; or
   mapping quantized coefficients indicated by each information group to an information group adjacent to the information group.

9. The method for transmitting a CSI report according to claim 1, wherein
in a case that BH/P is a non-integer and N is equal to ceil(BH/P), the number of element columns corresponding to any one of the following information subgroups is less than the number of element columns corresponding to other information subgroups:
the first information subgroup;
the last information subgroup; or
an information subgroup in which an element indicating a strongest coefficient is located;
in a case that BH/P is a non-integer and N is equal to floor(BH/P), the number of element columns corresponding to any one of the following information subgroups is greater than the number of element columns corresponding to other information subgroups:
the first information subgroup;
the last information subgroup; or
an information subgroup in which an element indicating a strongest coefficient is located;
in a case that BL/Q is a non-integer and N is equal to ceil(BL/Q), the number of element rows corresponding to any one of the following information subgroups is less than the number of element rows corresponding to other information subgroups:
the first information subgroup;
the last information subgroup; or
an information subgroup in which an element indicating a strongest coefficient is located;
in a case that BL/Q is a non-integer and N is equal to floor(BL/Q), the number of element rows corresponding to any one of the following information subgroups is greater than the number of element rows corresponding to other information subgroups:
the first information subgroup;
the last information subgroup; or
an information subgroup in which an element indicating a strongest coefficient is located;
in a case that BL/Q or BH/P is a non-integer and A*B is equal to ceil(BH/P)*ceil(BL/Q) or ceil[(BH/P)*(BL/Q)], the number of elements corresponding to any one of the following information subgroups or a combination of information subgroups is less than the number of elements corresponding to other information subgroups:
the first information subgroup;
the last information subgroup;
an information subgroup in which an element indicating a strongest coefficient is located; or
an information subgroup in which an element indicating a strongest coefficient is located, and any one of other information subgroups; and
in a case that BL/Q or BH/P is a non-integer and A*B is equal to floor(BH/P)*floor(BL/Q) or floor[(BH/P)*(BL/Q)], the number of elements corresponding to any one of the following information subgroups or a combination of information subgroups is greater than the number of elements corresponding to other information subgroups:
the first information subgroup;
the last information subgroup;
an information subgroup in which an element indicating a strongest coefficient is located; or
an information subgroup in which an element indicating a strongest coefficient is located, and any one of other information subgroups.

10. The method for transmitting a CSI report according to claim 1, wherein the mapping the bitmap to a bit stream portion by portion comprises any one of the following:
mapping elements of each portion to a bit stream column by column in ascending order of column indexes;
mapping elements of each portion to a bit stream column by column in descending order of column indexes;
mapping elements of each portion to a bit stream row by row in ascending order of row indexes; or
mapping elements of each portion to a bit stream row by row in descending order of row indexes; or,
wherein the mapping elements of the bitmap to a bit stream column by column comprises any one of the following:
mapping the elements of the bitmap to a bit stream column by column in ascending order of column indexes; or
mapping the elements of the bitmap to a bit stream column by column in descending order of column indexes; or,
wherein the mapping elements of the bitmap to a bit stream row by row comprises any one of the following:
mapping the elements of the bitmap to a bit stream row by row in ascending order of row indexes; or
mapping the elements of the bitmap to a bit stream row by row in descending order of row indexes.

11. The method for transmitting a CSI report according to claim 1, wherein an element, corresponding to a strongest coefficient, in the bitmap is not mapped to a bit stream.

12. The method for transmitting a CSI report according to claim 7, wherein in the case of dividing the bit stream into N groups, wherein N−1 groups each correspond to elements of P columns in the bitmap, the method further comprises assigning a group index to each information subgroup according to any one of the following rules:
assigning a group index to each information subgroup based on a sum of column indexes of all elements corresponding to the information subgroup;
assigning a group index to each information subgroup based on a minimum column index of all elements corresponding to the information subgroup;
defining that an information subgroup in which an element indicating a strongest coefficient is located has a largest group index, and assigning group indexes to other information subgroups based on a sum of column indexes of all elements corresponding to each information subgroup;
defining that an information subgroup in which an element indicating a strongest coefficient is located has a smallest group index, and assigning group indexes to other information subgroups based on a sum of column indexes of all elements corresponding to each information subgroup;
defining that an information subgroup in which an element indicating a strongest coefficient is located has a largest group index, and assigning group indexes to other information subgroups based on a minimum column index of all elements corresponding to each information subgroup;
defining that an information subgroup in which an element indicating a strongest coefficient is located has a smallest group index, and assigning group indexes to other information subgroups based on a minimum column index of all elements corresponding to each information subgroup;
defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups; or, wherein in the case of dividing the bit stream into N groups, wherein N−1 groups each correspond to elements of Q rows in the bitmap, the method further comprises assigning a group index to each information subgroup according to any one of the following rules:

assigning a group index to each information subgroup based on a sum of row indexes of all elements corresponding to the information subgroup;

assigning a group index to each information subgroup based on a minimum row index of all elements corresponding to the information subgroup;

defining that an information subgroup in which an element indicating a strongest coefficient is located has a largest group index, and assigning group indexes to other information subgroups based on a sum of row indexes of all elements corresponding to each information subgroup;

defining that an information subgroup in which an element indicating a strongest coefficient is located has a smallest group index, and assigning group indexes to other information subgroups based on a sum of row indexes of all elements corresponding to each information subgroup;

defining that an information subgroup in which an element indicating a strongest coefficient is located has a largest group index, and assigning group indexes to other information subgroups based on a minimum row index of all elements corresponding to each information subgroup;

defining that an information subgroup in which an element indicating a strongest coefficient is located has a smallest group index, and assigning group indexes to other information subgroups based on a minimum row index of all elements corresponding to each information subgroup;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups; or, wherein in the case of dividing the bitmap is into A*B portions and mapping the bitmap to a bit stream portion by portion, wherein each portion is one information subgroup, the method further comprises assigning a group index to each information subgroup according to any one of the following rules:

sorting information subgroups based on row index information and column index information that are of all elements corresponding to the information subgroups, and assigning a group index to each information subgroup based on a sequence of the information subgroups;

defining that an information subgroup in which an element indicating a strongest coefficient is located has a smallest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a largest group index, sorting other information subgroups based on row index information and column index information that are of all elements corresponding to information subgroups, and assigning group indexes to the other information subgroups based on a sequence of the other information subgroups;

defining that an information subgroup in which an element indicating a strongest coefficient is located has a smallest group index, sorting other information subgroups by using the information subgroup in which the element indicating the strongest coefficient is located as a start point, and assigning group indexes to the other information subgroups based on a sequence of information subgroups; or defining that an information subgroup in which an element indicating a strongest coefficient is located has a largest group index, sorting other information subgroups by using the information subgroup in which the element indicating the strongest coefficient is located as a start point, and assigning group indexes to the other information subgroups based on a sequence of information subgroups.

13. A method for transmitting a channel state information CSI report, applied to a network device side and comprising:

receiving a channel state information CSI report of a terminal, wherein the CSI report has at least one of the following information in the CSI report discarded: non-zero quantized coefficients in a compressed coefficient matrix at each layer, or a bitmap indicating the quantized coefficients;

determining the number of bits of a bitmap in the CSI report based on priority information preset for information groups, and demodulating the bitmap based on the number of bits of the bitmap; and determining the number of bits of a quantized coefficient based on the demodulated bitmap, and demodulating the quantized coefficient based on the number of bits of the quantized coefficient;

wherein the information groups are obtained through dividing non-zero quantized coefficients in a compressed coefficient matrix and a bitmap indicating the quantized coefficients;

wherein a manner of the dividing comprises any one of the following:

mapping elements of the bitmap to a bit stream column by column, and dividing the bit stream into N information subgroups, wherein N−1 information subgroups each correspond to elements of P columns in the bitmap, P is a preset group length, N is equal to ceil(BH/P) or floor(BH/P), ceil is round up, floor is round down, and BH is the number of columns in the bitmap;

mapping elements of the bitmap to a bit stream row by row, and dividing the bit stream into N information subgroups, wherein N−1 information subgroups each correspond to elements of Q rows in the bitmap, Q is a preset group length, N is equal to ceil(BL/Q) or floor(BL/Q), and BL is the number of rows in the bitmap;

dividing the bitmap into A*B portions, wherein (A−1)*(B−1) portions comprise elements of P columns and Q rows; and mapping the bitmap to a bit stream portion by portion, wherein each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], and floor[(BH/P)*(BL/Q)];

mapping elements of the bitmap to a bit stream column by column, and dividing the bit stream into N information subgroups, wherein N−1 information subgroups each comprise S bits, S is a preset group length, N is equal to ceil(BS/S) or floor(BS/S), and BS is a total number of bits in the bitmap; or mapping elements of the bitmap to a bit stream row by row, and dividing the bit stream into N information subgroups, wherein N−1 information subgroups each comprise S bits, and S is a preset group length.

14. The method for transmitting a CSI report according to claim 13, wherein the quantized coefficient comprises at least one of the following: an amplitude quantization value or a phase quantization value.

15. The method for transmitting a CSI report according to claim 13, wherein the priority information preset for information groups satisfies any one of the following rules:

a bitmap of each group and quantized coefficients indicated by the bitmap belong to a same information group, and a priority of the bitmap is the same as a priority of the quantized coefficients indicated by the bitmap;

a bitmap of each group and quantized coefficients indicated by the bitmap belong to a same information group, and a priority of the bitmap is higher than a priority of the quantized coefficients indicated by the bitmap;

a bitmap of each group and quantized coefficients indicated by the bitmap belong to adjacent information groups, and a priority of the bitmap is higher than a priority of the quantized coefficients indicated by the bitmap; or a bitmap of each group and quantized coefficients indicated by the bitmap belong to adjacent information groups, and a priority of the bitmap is lower than a priority of the quantized coefficients indicated by the bitmap.

16. The method for transmitting a CSI report according to claim 13, wherein the priority information preset for information groups satisfies any one of the following rules:

a priority of an information group a is higher than a priority of an information group a+1, wherein a is greater than or equal to 0 and less than a group quantity, and is an information group index; or a priority of an information group a+1 is higher than a priority of an information group a.

17. The method for transmitting a CSI report according to claim 15, wherein in a case that the bitmap and quantized coefficients indicated by the bitmap belong to a same information group, in each of the information groups, a bitmap of each layer is followed by quantized coefficients indicated by the bitmap or bitmaps of all layers are followed by quantized coefficients indicated by the bitmaps; and in a case that the bitmap and quantized coefficients indicated by the bitmap belong to different information groups, a bitmap of each group is followed by quantized coefficients indicated by the bitmap.

18. A communications device, comprising a processor, a memory, and a program stored in the memory and capable of running on the processor, wherein when the program is executed by the processor, the steps of a method for transmitting a channel state information (CSI) report are implemented, wherein the method comprises:

dividing non-zero quantized coefficients in a compressed coefficient matrix and a bitmap indicating the quantized coefficients into a plurality of information groups;

discarding, based on priority information preset for information groups, at least one of the following information in the CSI report: the quantized coefficients or the bitmap; and transmitting the CSI report with the information discarded;

wherein the information groups are obtained through dividing non-zero quantized coefficients in a compressed coefficient matrix and a bitmap indicating the quantized coefficients;

wherein a manner of the dividing comprises any one of the following:

mapping elements of the bitmap to a bit stream column by column, and dividing the bit stream into N information subgroups, wherein N−1 information subgroups each correspond to elements of P columns in the bitmap, P is a preset group length, N is equal to ceil(BH/P) or floor(BH/P), ceil is round up, floor is round down, and BH is the number of columns in the bitmap;

mapping elements of the bitmap to a bit stream row by row, and dividing the bit stream into N information subgroups, wherein N−1 information subgroups each correspond to elements of Q rows in the bitmap, Q is a preset group length, N is equal to ceil(BL/Q) or floor(BL/Q), and BL is the number of rows in the bitmap;

dividing the bitmap into A*B portions, wherein (A−1)*(B−1) portions comprise elements of P columns and Q rows; and mapping the bitmap to a bit stream portion by portion, wherein each portion is one information subgroup, P and Q are preset group lengths, and A*B is equal to any one of the following: ceil(BH/P)*ceil(BL/Q), floor(BH/P)*floor(BL/Q), ceil[(BH/P)*(BL/Q)], and floor[(BH/P)*(BL/Q)];

mapping elements of the bitmap to a bit stream column by column, and dividing the bit stream into N information subgroups, wherein N−1 information subgroups each comprise S bits, S is a preset group length, N is equal to ceil(BS/S) or floor(BS/S), and BS is a total number of bits in the bitmap; or mapping elements of the bitmap to a bit stream row by row, and dividing the bit stream into N information subgroups, wherein N−1 information subgroups each comprise S bits, and S is a preset group length.

* * * * *